Figure 9:
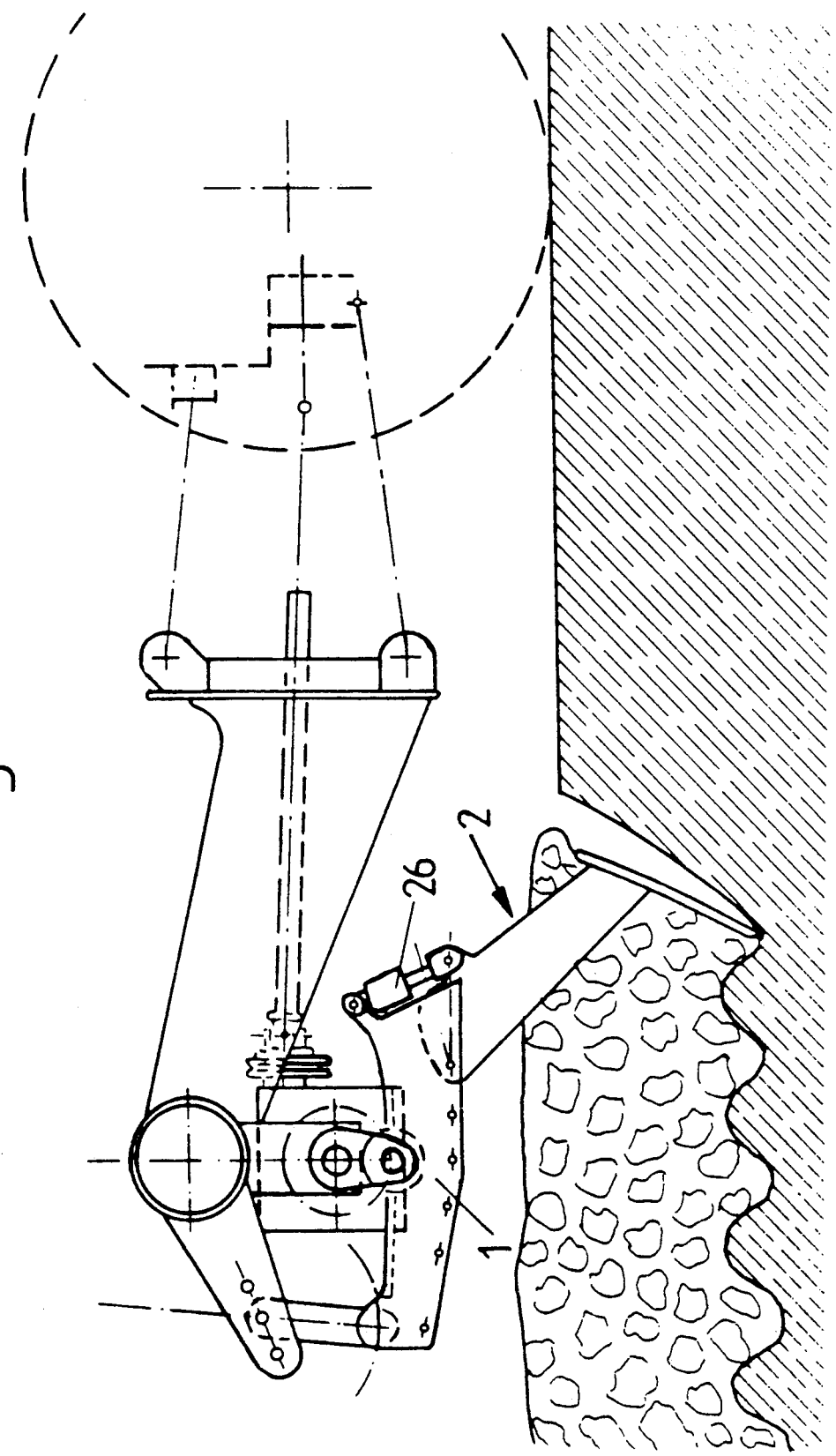

United States Patent [19]

Straus

[11] Patent Number: 5,172,768
[45] Date of Patent: Dec. 22, 1992

[54] DEVICE FOR LOOSENING SOIL

[76] Inventor: Reinhold Straus, Pappelweg 5, 695 Mosbach, Fed. Rep. of Germany

[21] Appl. No.: 496,928

[22] Filed: Mar. 21, 1990

Related U.S. Application Data

[62] Division of Ser. No. 268,362, filed as PCT/EP86/00764, Dec. 19, 1986, abandoned.

[30] Foreign Application Priority Data

Dec. 23, 1985 [DE] Fed. Rep. of Germany ....... 3545970

[51] Int. Cl.$^5$ .................. A01B 11/00; A01B 49/06
[52] U.S. Cl. ................................. 172/89; 111/74; 111/170; 111/131; 172/84
[58] Field of Search .............. 172/35, 48, 60, 84, 172/85, 87, 89, 97, 118, 438, 66, 608; 111/170, 171, 174, 177, 187, 183, 184, 74, 132; 222/196, 201

[56] References Cited

U.S. PATENT DOCUMENTS

| | | | |
|---|---|---|---|
| 85,379 | 12/1868 | Going | 222/201 X |
| 343,280 | 6/1886 | Rowell et al. | 111/97 |
| 664,477 | 12/1900 | Holtzclaw | 222/201 |
| 993,403 | 5/1911 | Preuss | 172/84 |
| 1,400,673 | 12/1921 | Gilliland | 172/89 |
| 1,847,327 | 3/1932 | Bateman | 111/171 X |
| 2,123,318 | 7/1938 | Taylor | 222/201 X |
| 3,631,825 | 1/1972 | Weiste | 111/171 X |
| 4,473,016 | 9/1984 | Gust | 111/174 |
| 4,568,444 | 5/1986 | Thiessen | 172/60 X |
| 4,646,941 | 3/1987 | Grosse-Scharmann et al. | 111/171 X |
| 4,901,655 | 2/1990 | Magda | 172/97 X |

FOREIGN PATENT DOCUMENTS

| | | | |
|---|---|---|---|
| 927919 | 5/1947 | France | 172/89 |
| 464285 | 3/1975 | U.S.S.R. | 111/177 |

OTHER PUBLICATIONS

"Paddle Plow", Farm Show Article, vol. 12, No. 1, 1988, p. 24.

Primary Examiner—Dennis L. Taylor
Assistant Examiner—Jeffrey L. Thompson
Attorney, Agent, or Firm—Kinzer, Plyer, Dorn, McEachran & Jambor

[57] ABSTRACT

The process serves for the loosening of soil in the subsoil and topsoil areas and for introduction of fertilizers as well as subsoil loosening and/or for soil cultivation as well as the introduction of other additives with the use of digging tools 2, 2′, and 2″ by which the soil is broken up. In this case, the digging edge of digging tool 2, 2′, and 2″ is guided in an elliptical motion and this motion is superimposed by a straight motion, i.e., the driving motion. A cycloid is therefore produced for the digging edge. The longer axis of the ellipse in this case is directed from the soil surface into the soil in this manner and exhibits an angle to the travel direction. The additive, such as, for example, fertilizers, can be blown into the fissure forming behind tool 2.

20 Claims, 26 Drawing Sheets

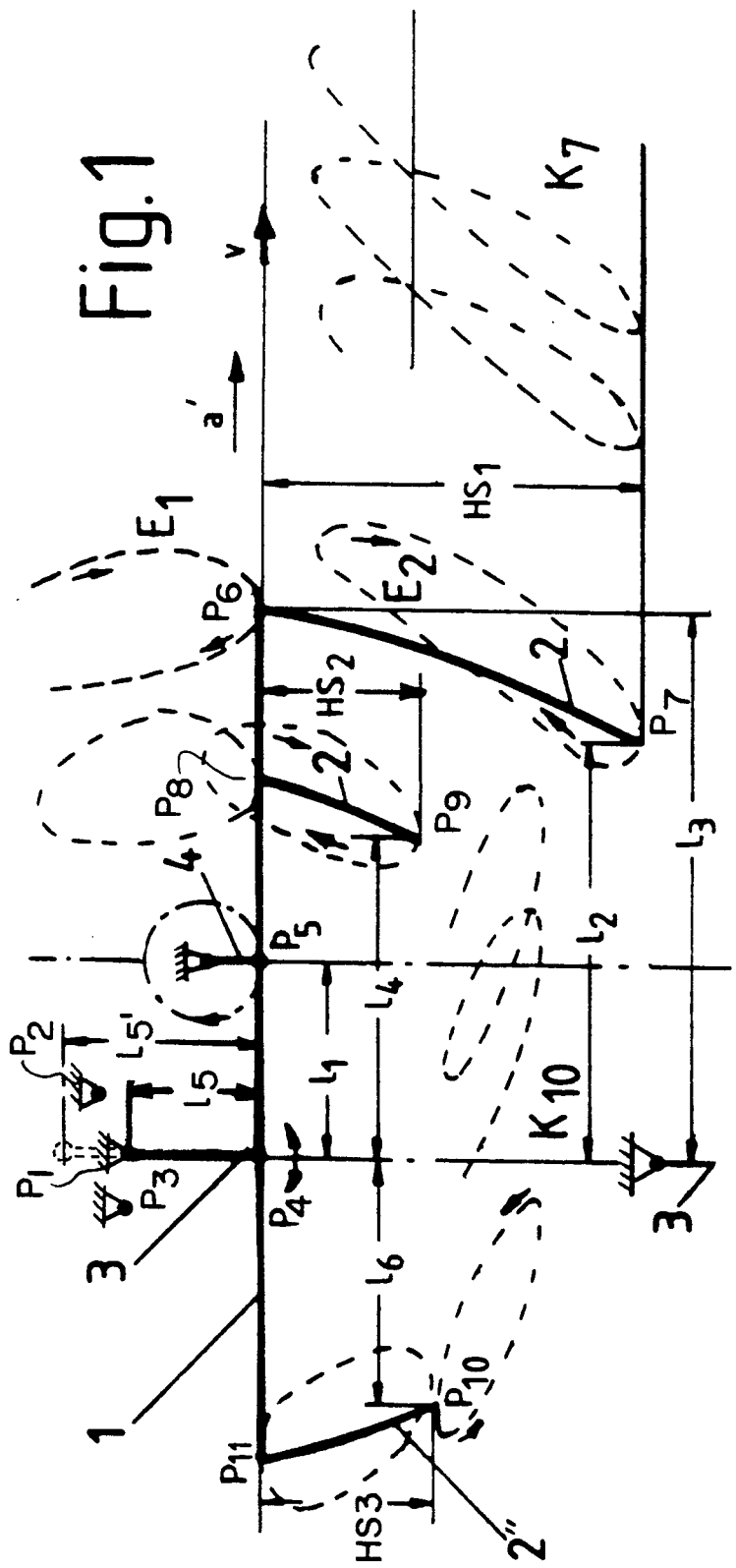

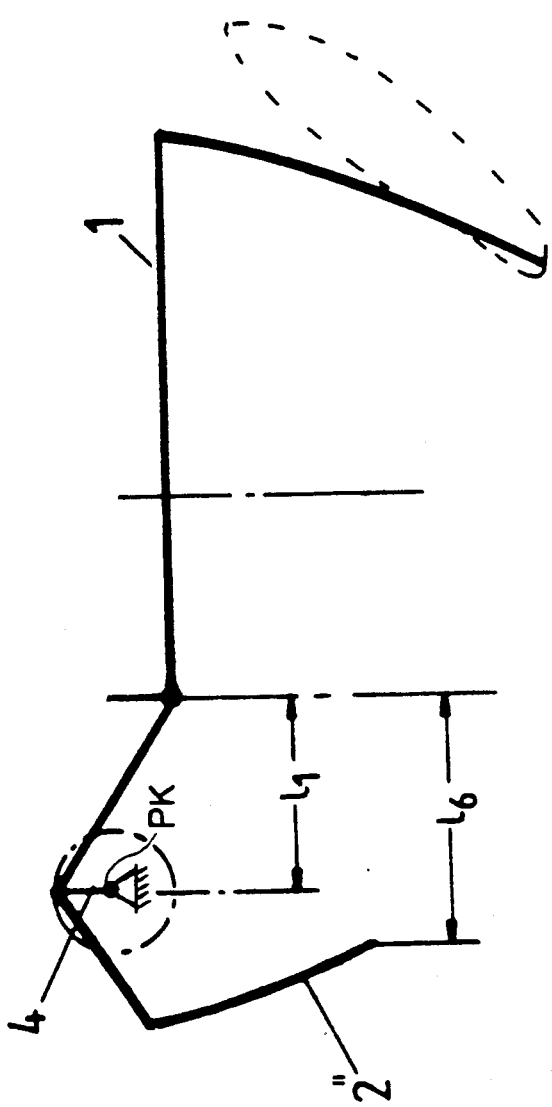

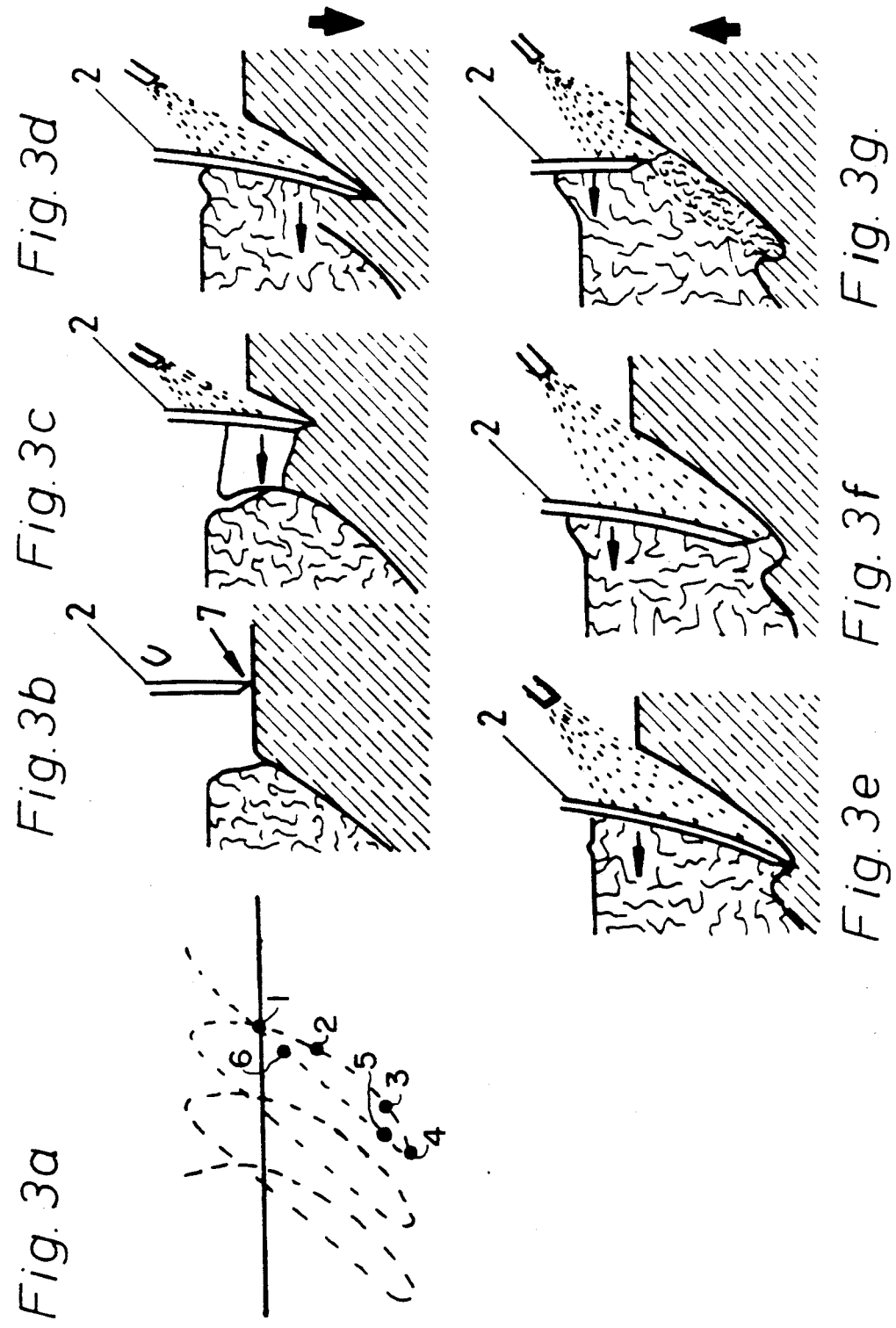

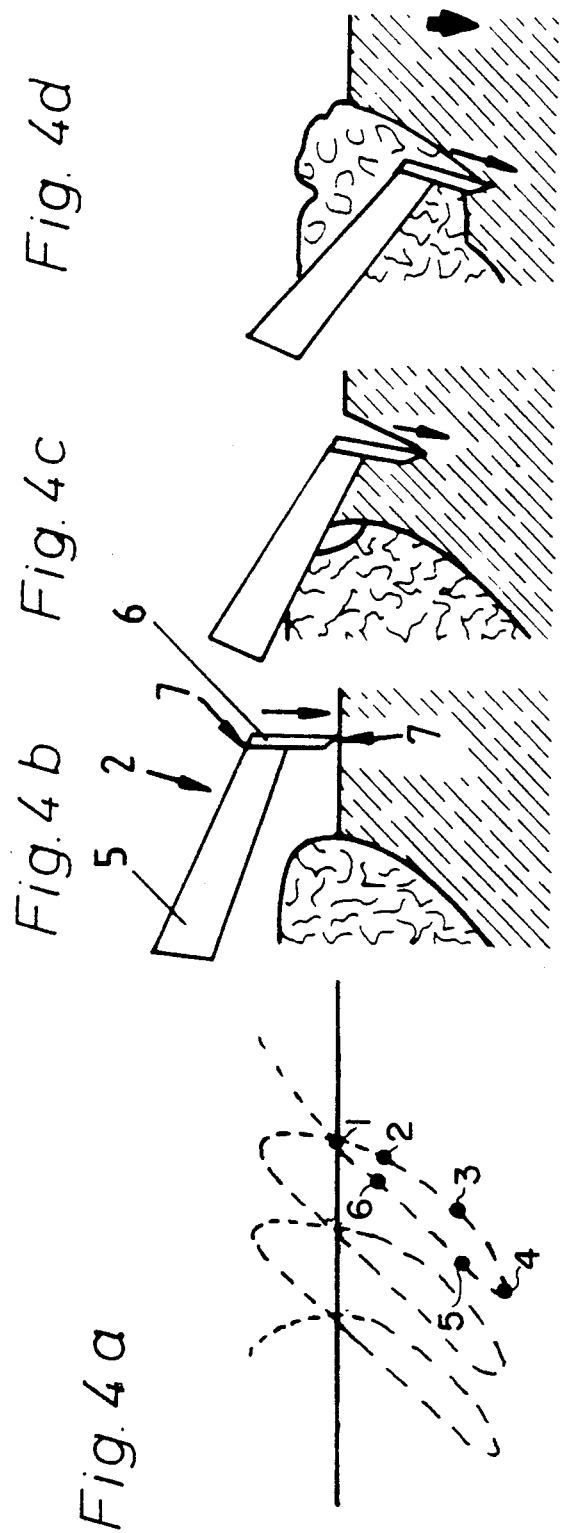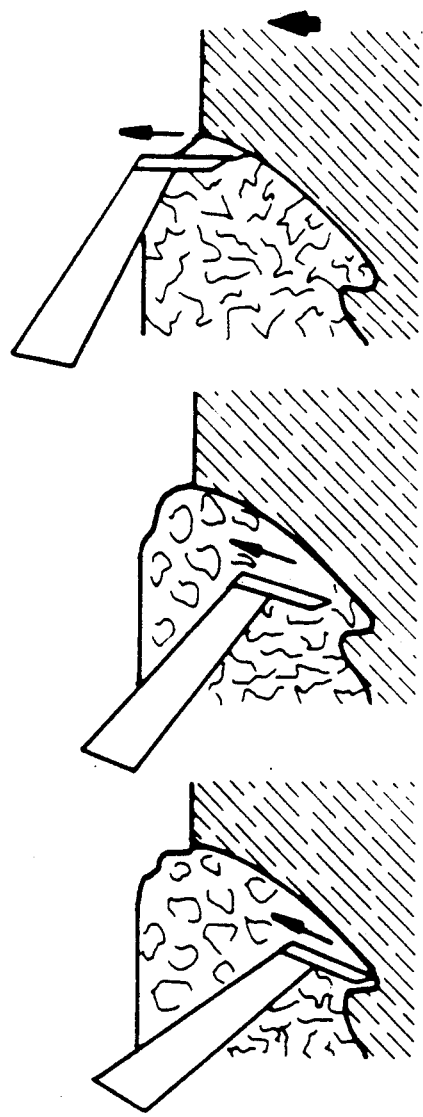

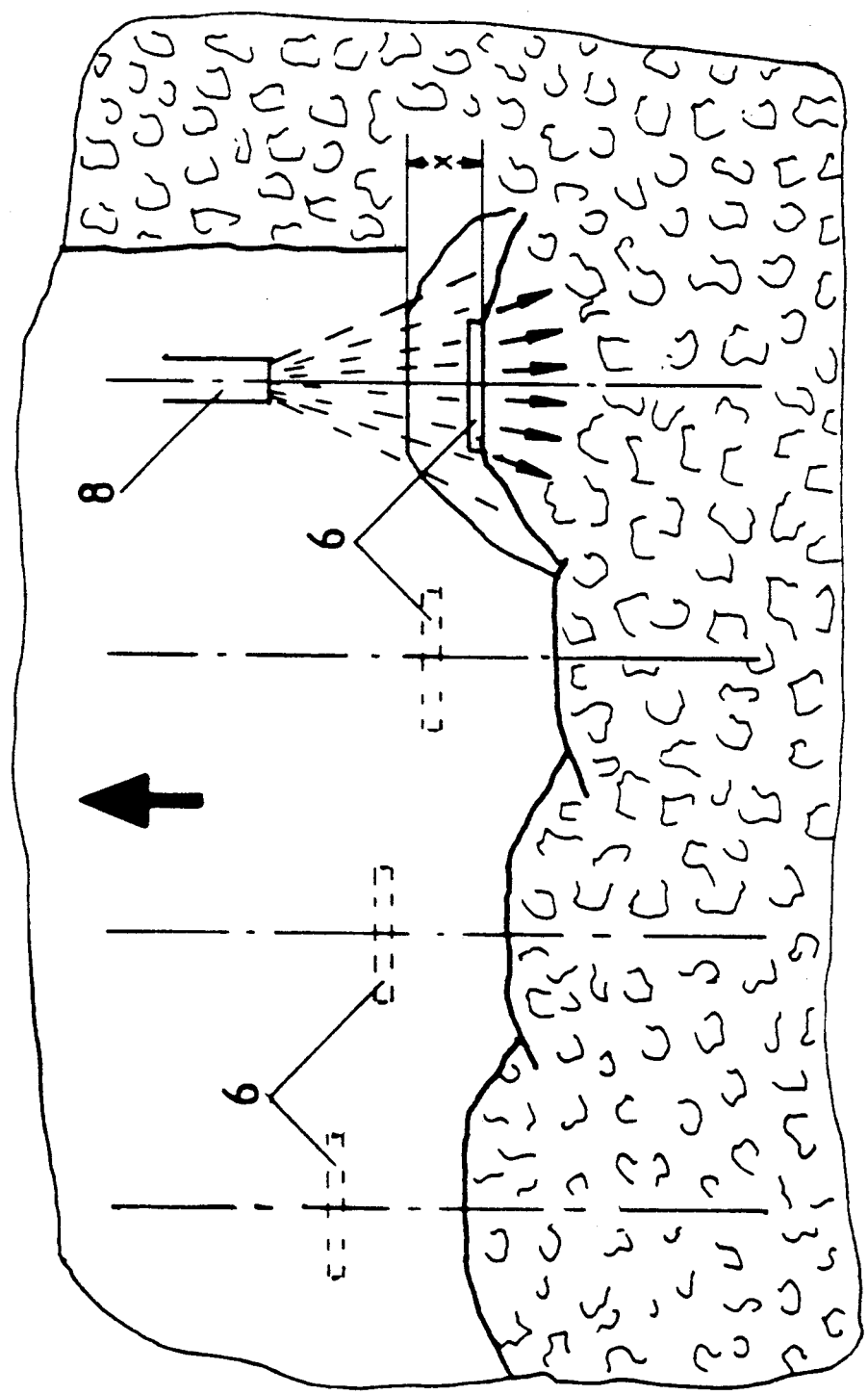

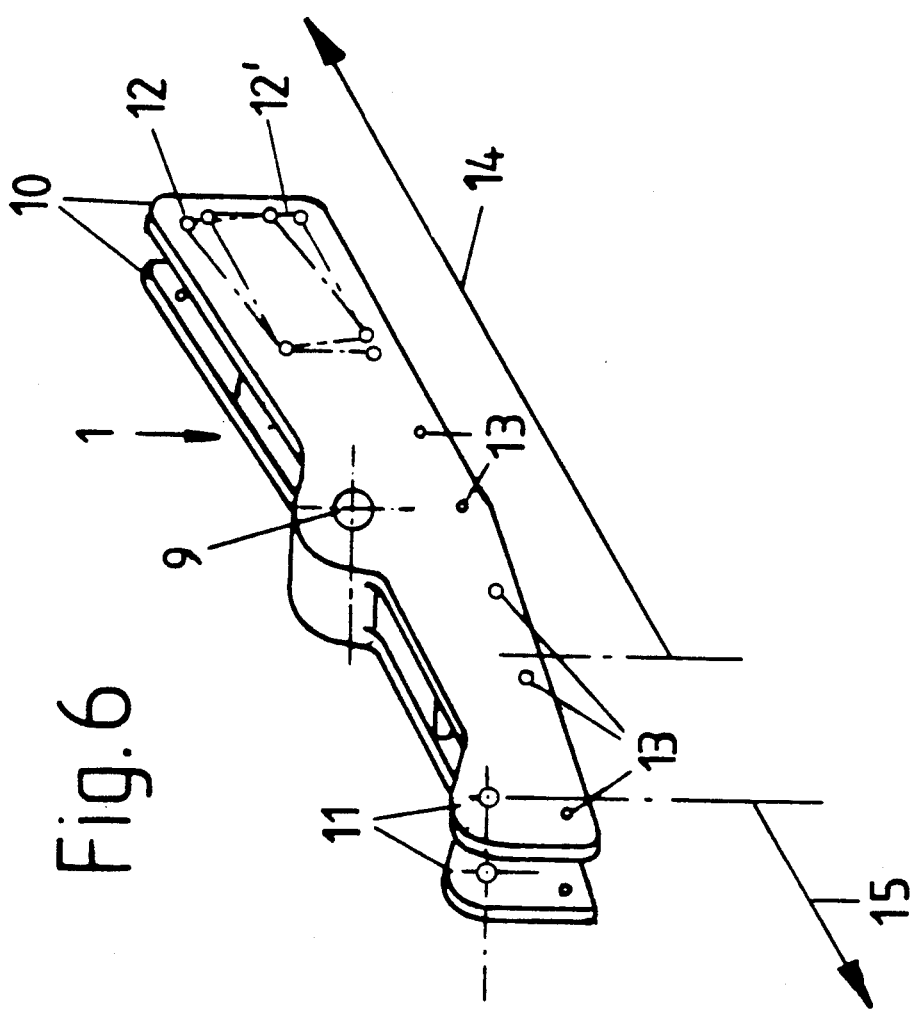

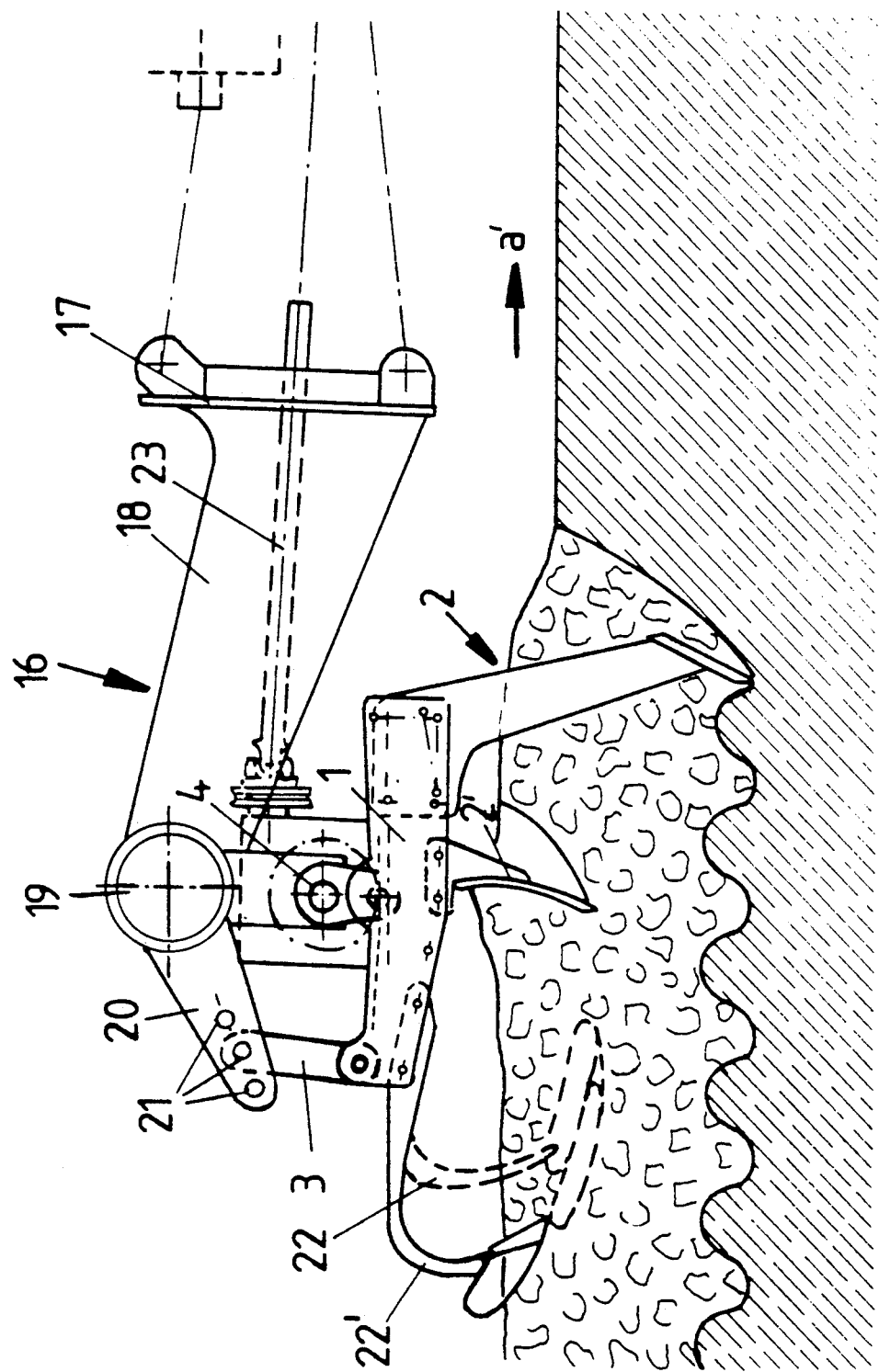

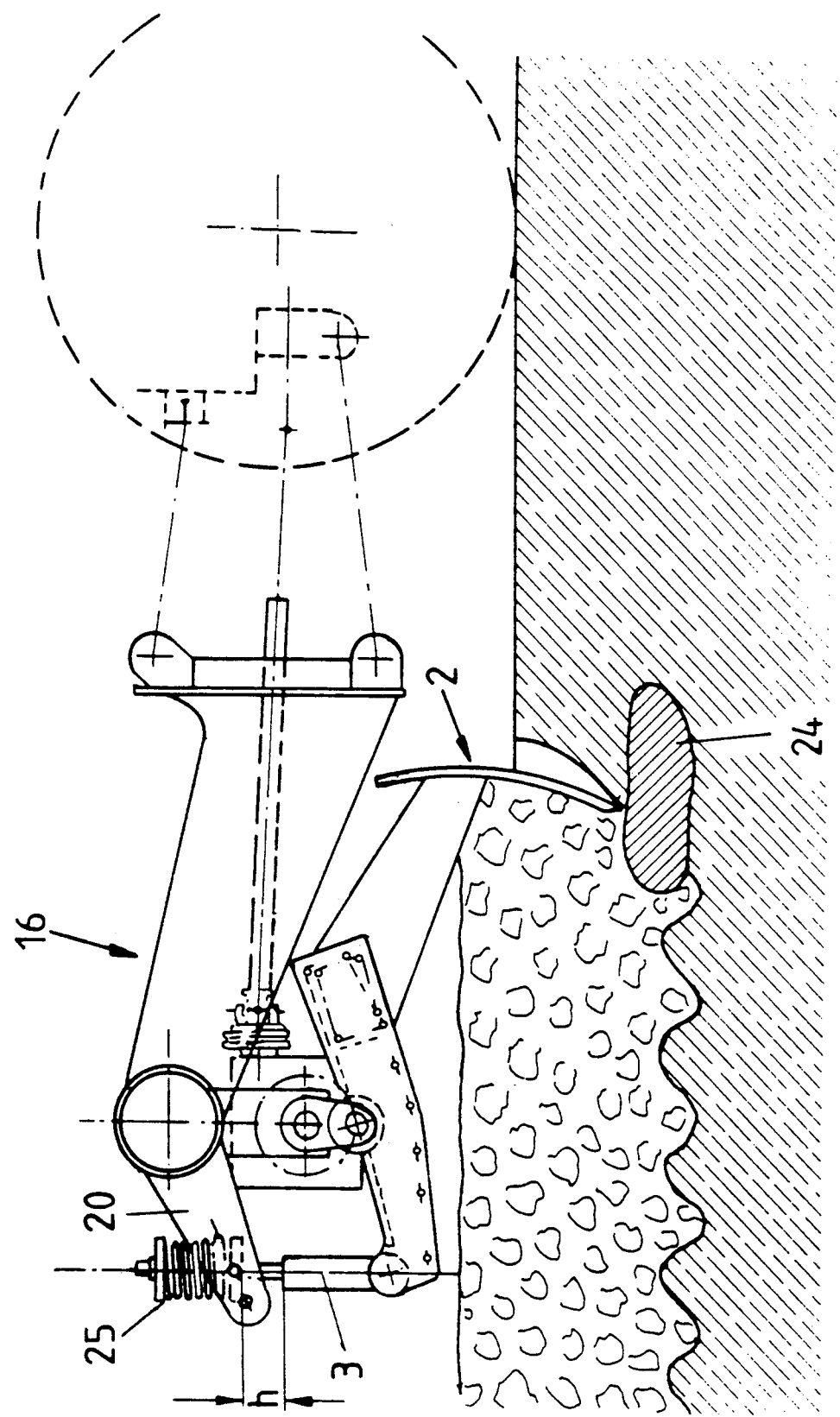

DEVICE FOR LOOSENING SOIL

This is a division of copending application Ser. No. 07/268,362 filed on Jun. 23, 1988 (now abandoned). International Application PCT/EP 86/70064 filed on Dec. 19, 1986 and which designated the U.S.

In agriculture, it is necessary to till soils that have poor structure. Due to modern cultivation methods and progressively heavier agricultural machines, many soils exhibit strong compaction in the surface and plow-runner areas. Waterlogging and damage by drying are the consequences of this. Sensitive plant roots are not in the position to overcome the resistance to depth. Thus, only a limited growing area is available for them and the soil participating in the growth only possesses a limited water-storage capacity.

Such structural damage can be eliminated by deep loosening apparatuses. A stabilization of the newly created soil structure is possible by a simultaneous deep fertilization using an auxiliary apparatus. The apparatuses currently found on the market, however, are designed so that very large traction forces are necessary for their operation which can be applied only by extremely large tractors and bulldozers. Therefore, for cost reasons, often urgently necessary soil-improvement measures can only be carried out in a limited extent or the desired yields can only be reached by heavy fertilization of the topsoil area.

The forest and the battle against the death of the forest are an additional area of concern in the cultivation of soils. The causes for the death of the forests are attributed to the influences of acid rain, acid soil, nutrient deficiency, and dryness, as well as a series of other factors. Since these influences are present and also will be present even more extremely in the future, agents and methods must be found to eliminate the actions of these influences. The most logical and probably also the most effective solution would be to increase the resistance of the trees. This means that nutrients must be replaced in case of an absolute deficiency (surface and deep fertilization), and that, on the other hand, nutrients established in the soil can be mobilized by influencing the soil dynamics (indirect fertilization), in which aeration, the water household (e.g., storability with looser soils), the temperature, and the soil reaction play decisive roles.

Soil improvement measures can be carried out in the forest only about every 50 years, i.e. when it has been cleared and a natural restocking has not yet taken place. A further possibility for soil improvement exists directly before an artificial planting. With these prerequisites, the young plants encounter advantageous conditions for an intensive deep rooting, and respond to the large growing space which permits them to have rapid growth and high resistance.

Systems which proceed from a pure surface fertilization have the disadvantage that they are strongly time-delayed and have a weak action since the soils have not been changed by mechanical influences. Based on the vigorous discussions concerning the death of the forests, the present time is very favorable for the introduction of soil-improvement measures in the forest.

Soil-improvement measures are also of great importance in orchards, gardens, and vineyards. Also, the previously named arguments for the most part are essentially true here. In these cultivations, however, service lives of about 20 years are being considered. A further difference is also based on the fact that, here, the working and cultivation is possible between the rows at any time and, thus, strong compaction results in the paths. Deep-loosening apparatuses which operate with minor destruction to the roots and are favorable with respect to the traction force have great advantages, in working between rows, with simultaneous deep fertilization. It is known that subterranean encapsulated roots in monoculture fruit growing do not release their nutrients as a result of compaction and, moreover, unleash toxic reactions. The resultant negative influence in this case is considerable.

Soil stabilization in road construction comes into consideration as a further area of application. Soil stabilization in road construction often presents great difficulties. The about 50-cm-thick application of the road substructure in layers with an overburden by the admixing of lime and the subsequent compaction with vibrating rollers or other compactors are included among these difficulties. The official instructions with regard to the exact, uniform admixing of the lime are regulated very strictly. The admixing presents great problems, particularly with soils interspersed with rocks. Rotary cutter machines react very sensitively toward rocks, for example. A further unpleasant aspect is the effect of lime dust on the operating personnel of the excavation and feeding apparatuses.

It is important in deep loosening that the compacted soils be pulverized into the smallest possible aggregates and that the productive topsoils not be displaced underneath as in plowing; rather, the soil bed should be at least roughly retained. Only in exceptional cases, usually only insignificant, is a thorough mixing of subsoil and topsoil desirable.

The principle of loosening by plowing, which was customary up to the present, fulfills this insofar as it concerns portable apparatus (moving blades) in many cases. However, since the loosening intensity is the greatest in the range of the blade, the soil layers laying above, such as, e.g., the plow-runner area, are not engaged with sufficient intensity with certain soil structures. Rigid apparatuses as a rule do not fulfill the posed demands. With the rigid loosening system by plowing, the entire loosening must be accomplished through the operating drive, while in the movable systems about 60-80% of the loosening performance is accomplished through this drive, which in both cases represents a very intensive use of traction force.

It is known that, in the systems mentioned, soil improvement work can only be carried out under very favorable weather conditions and, in addition, the work is seasonally limited. Thus, e.g., a qualitative deep loosening of the soil is no longer possible with most soil types, such as with wet soil below the rolling limit of the soil according to the rules prevailing at that time. A soil improvement operation according to the plowing system often can no longer be carried out with bulldozers as the tractors, usually due to the lack of traction power, especially with surface-wet soils, which, however, are dry (capable of loosening) in the subsoil. Furthermore, the necessarily high proportion of slippage is accompanied by a poor efficiency, high wear, and, thus, is not economical. Therefore, these types of systems are problematical for simultaneous deep fertilization since the feeding mechanism plugs continually and feeding behind the blade is possible only in the form of bands (layerwise). The fertilizer often being applied in concentrated form over the loosening runner frequently results in, as a consequence, groundwater contamination.

In contrast, a qualitative deep fertilization (soil-improvement fertilization) is then present when the soil-improvement fertilizers are introduced in a uniform distribution down to the full loosening depth. Root humus is produced by the strong root activities in the subsoil resulting in this manner, and the soil structure is stabilized. By these prerequisites, the fertilizer is bound and cannot be displaced into the groundwater.

The goal of the invention is to propose a process and an apparatus by which or with which it is possible to loosen the compacted soils down to a depth of approximately 60–80 cm with extremely low traction power or extremely low slippage with retention of the soil bed and, if needed, to carry out a subsoil cultivation as well as a qualitative deep fertilization without needing to carry along instruments for fertilizer introduction into the soil.

Finally, a further model form shows that the crossbeam is arranged on a parallelogram lever system.

The process according to the invention and also the apparatus bring the advantage that it is operated according to the breaking system and that it requires no force or only a slight tractive force dependent on the application. The dominating portion of the power necessarily flows through the power take-off shaft. The apparatuses also classified under the breaking system such as rotary cutter machines, rotary spading machines, and the like are being used at this time for subsoil cultivation. Deep rotary cutters are used only in isolated cases for subsoil improvement; however, these have been proven to be disadvantageous due to their extremely low surface performance and the extremely high power requirements as well as excessive mixing of the subsoil and topsoil.

As a result of continual fresh penetration into the soil, crop residues found on the surface are not caught, rake-like, by the individual teeth as in other systems, but rather are cut with each cut and upon removal of the cutter are left lying there. Such a system acts very advantageously in the cultivation of superficially wet and previously cultivated, e.g. plowed, soils since a qualitative deep loosening is possible in spite of the poor traction of the topsoil.

Since no power or only slight tractive power is necessary, the apparatus is extensively independent of gradients and is usable even with wet topsoils. Furthermore, safety devices are provided which permit its use with the occurrence of obstructions such as rocks, stumps, branches, etc.

It is possible by appropriate tool combinations to use such an apparatus for the deep loosening, deep fertilization, and topsoil cultivation or, at the same time, only for topsoil cultivation. Such tool combinations are simple to produce since the apparatus is constructed according to the modular principle.

The application ranges of the process and apparatus according to the invention are thus very diverse. In agriculture, it can be used for the cultivation of soils with poor structure in the subsoil and topsoil area. Use in the forest for combatting the death of the forest is advantageous since fertilizers of widely varying consistency and composition can be inoculated in the forest soils down to depths of approximately 50 cm. Further use in orchards, gardens and vineyards stipulates planting with very simplified prerequisites; thus, it is cost-favorable. The process and the apparatus can be used advantageously for soil stabilization in road construction. In this case, the lime stabilizer can be broken up and simultaneously incorporated, which, compared to the prior practices, represents a strong reduction in dust and increase in power.

Figure 10:
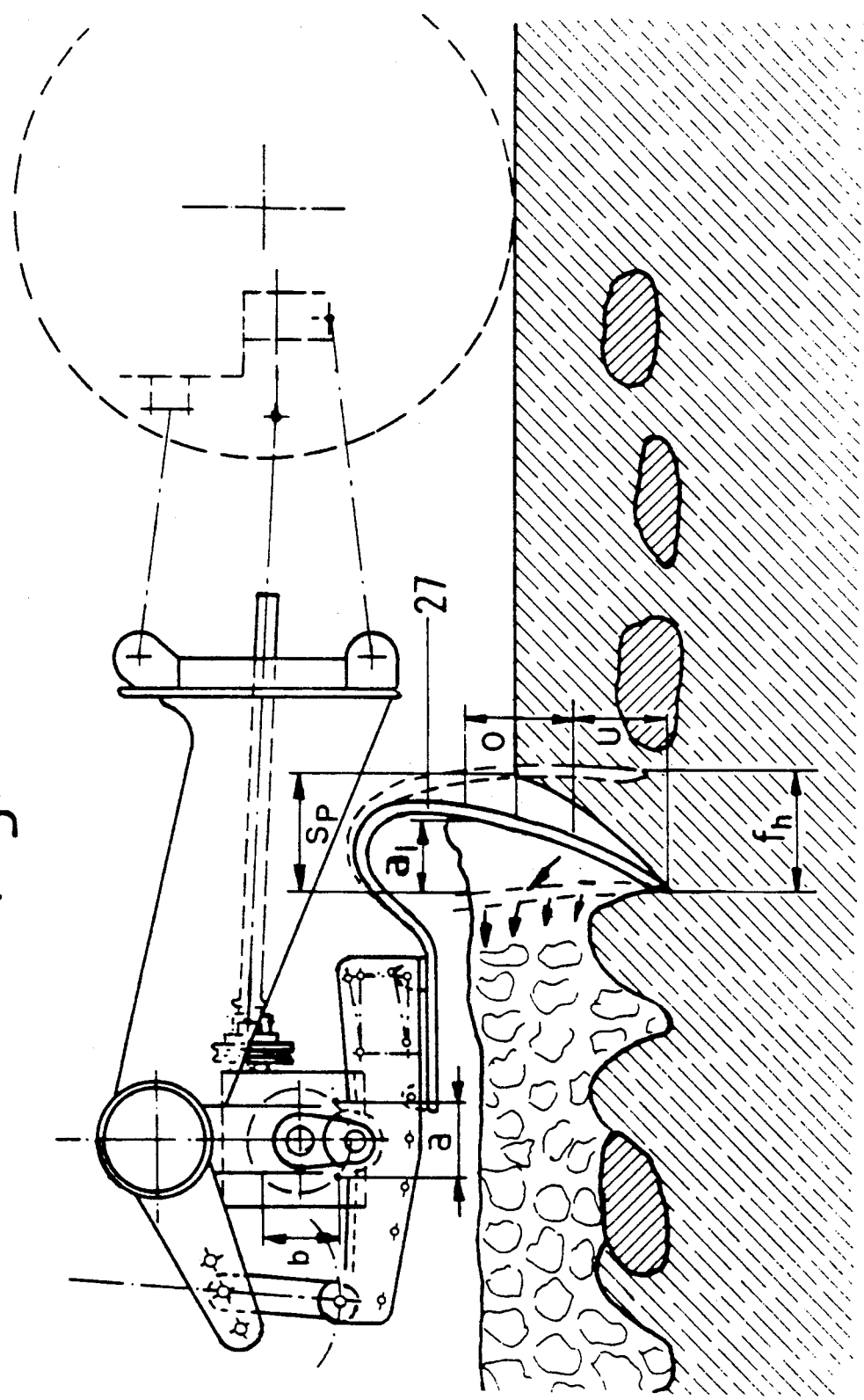
Figure 11:
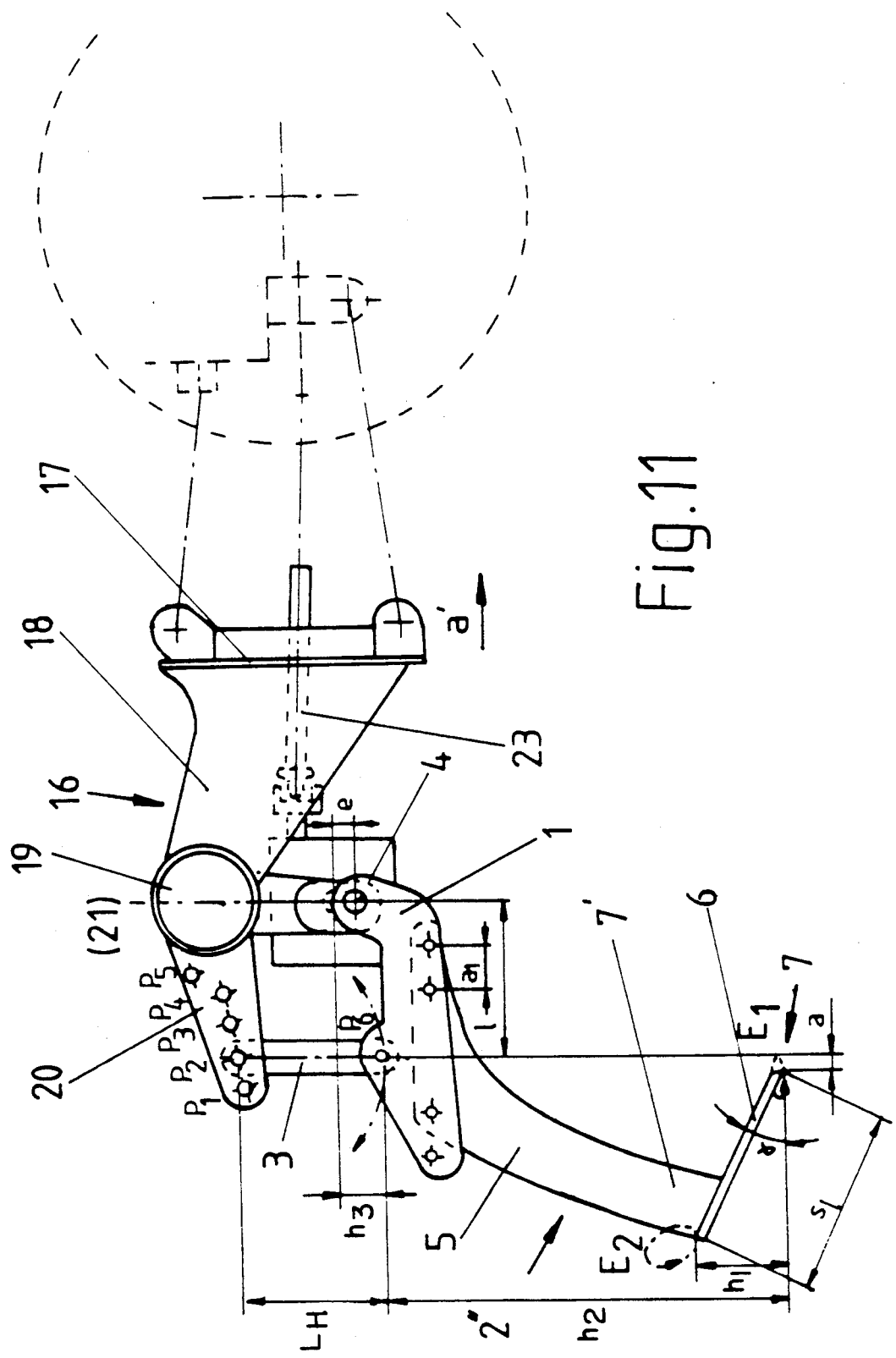
Figure 12:
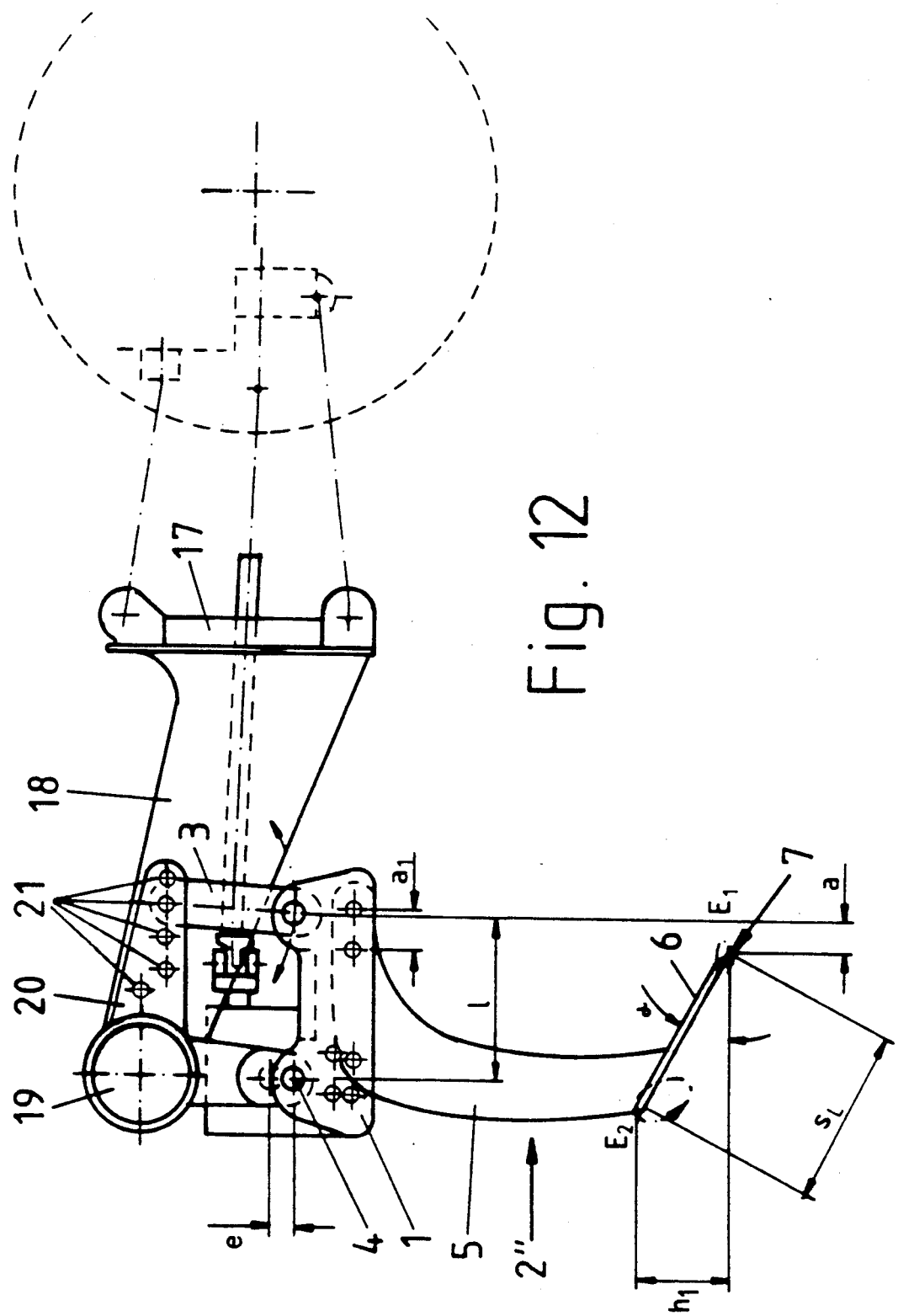
Figure 13:
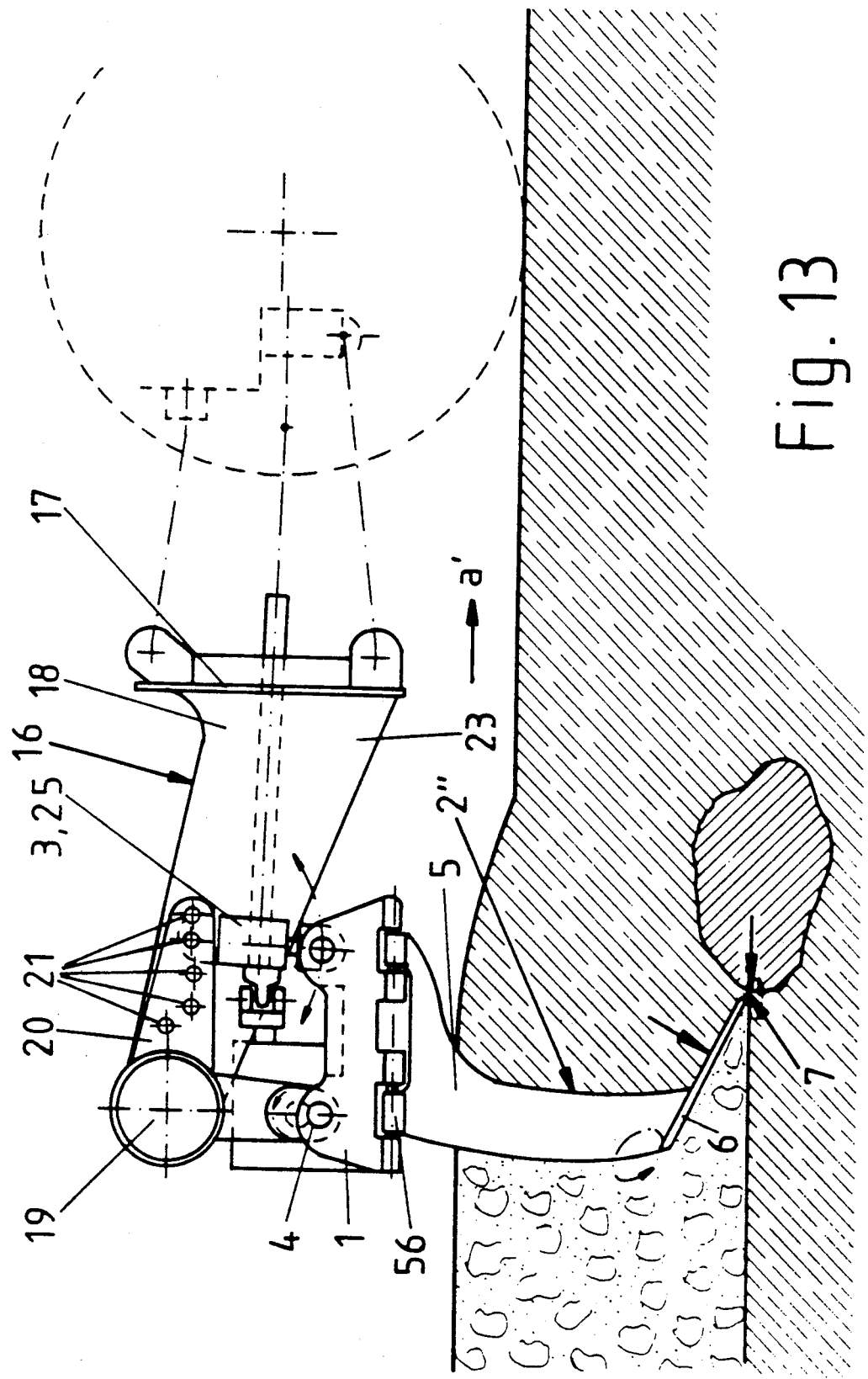
Figure 14:
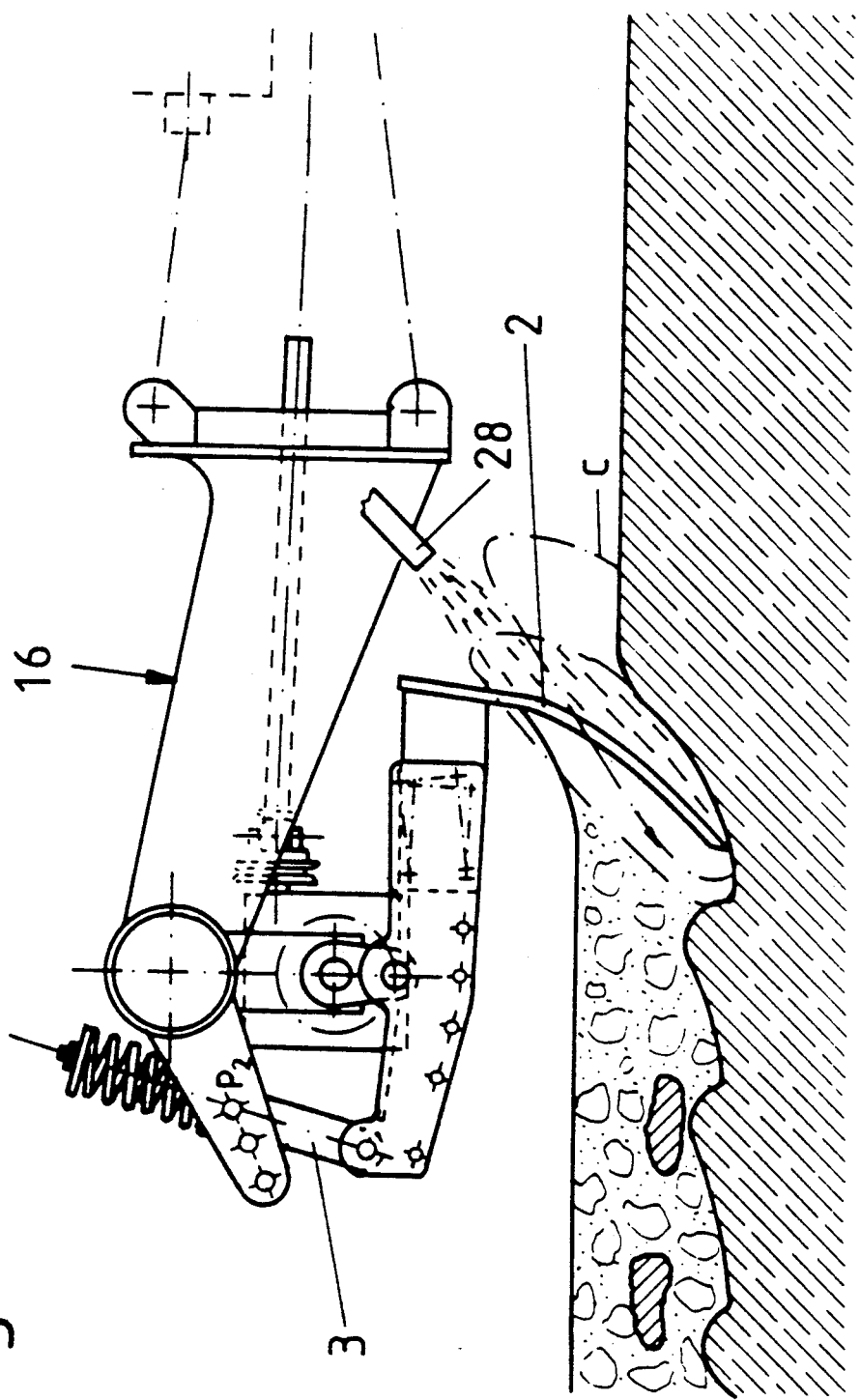
Figure 15:
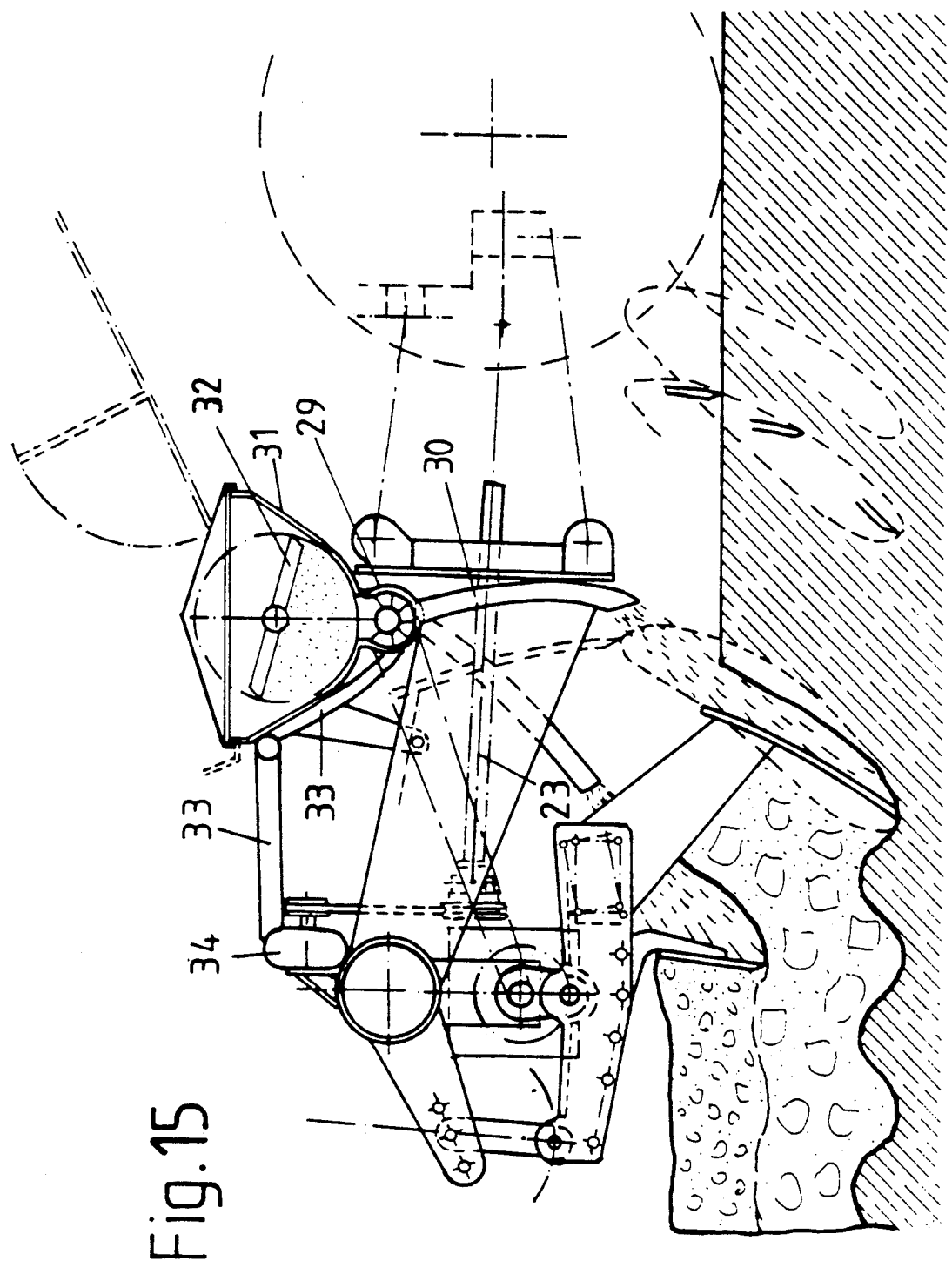
Figure 16:
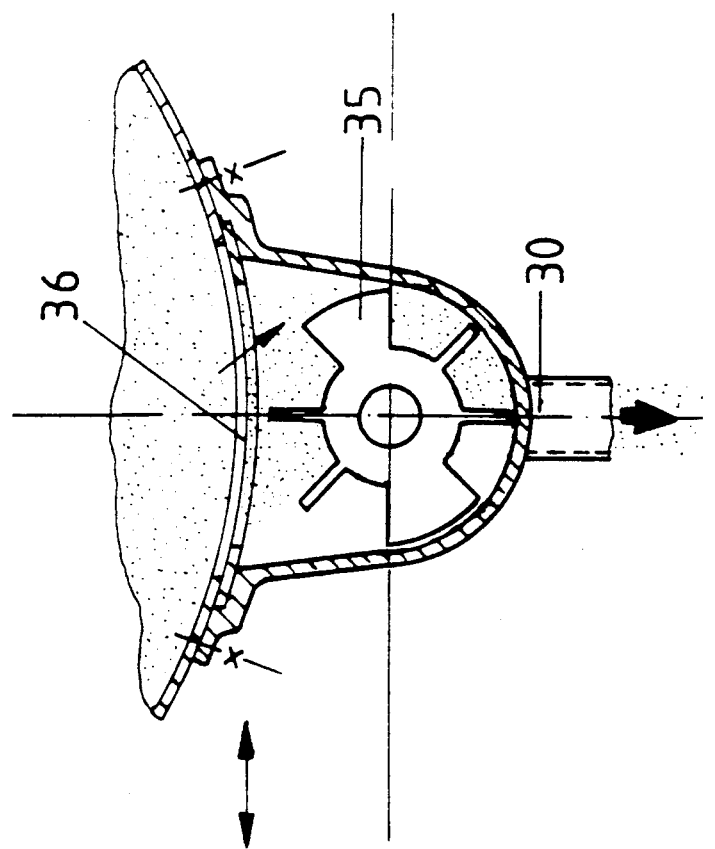
Figure 17:
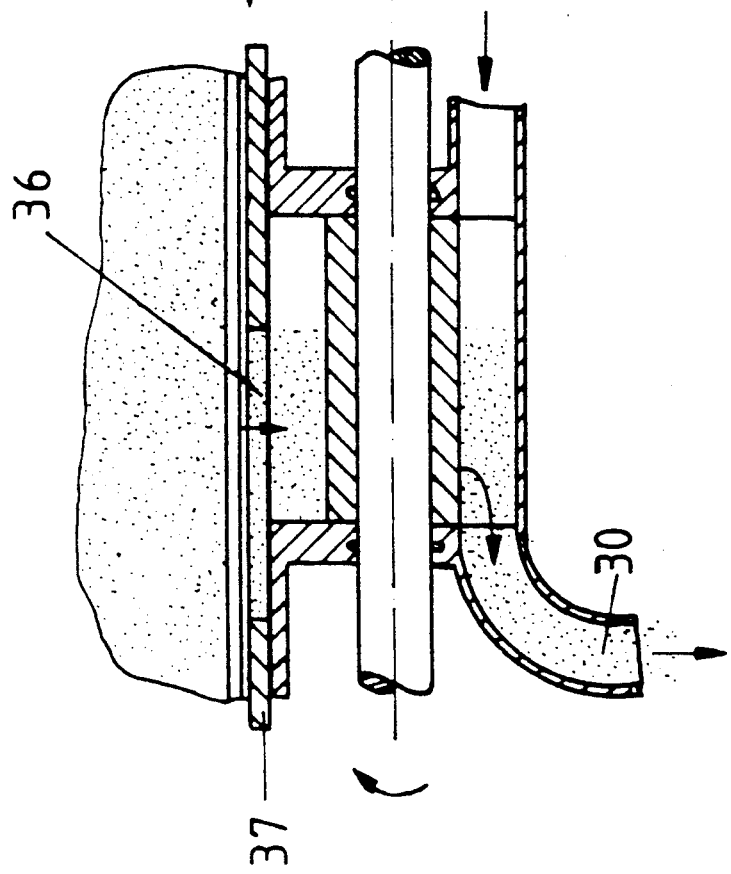
Figure 20:
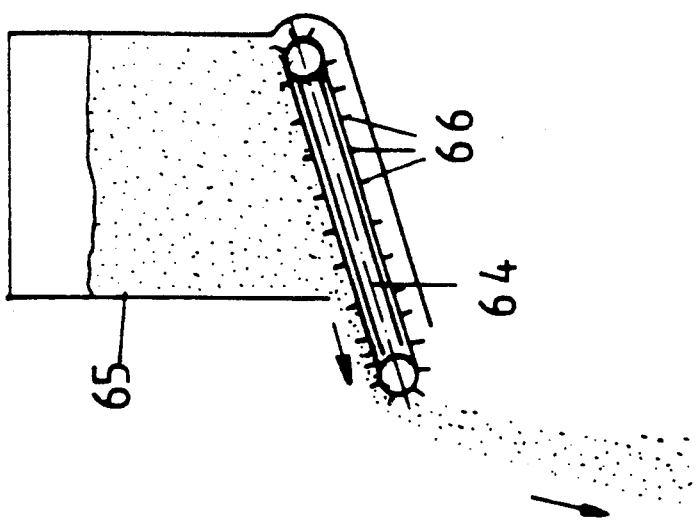
Figure 19:
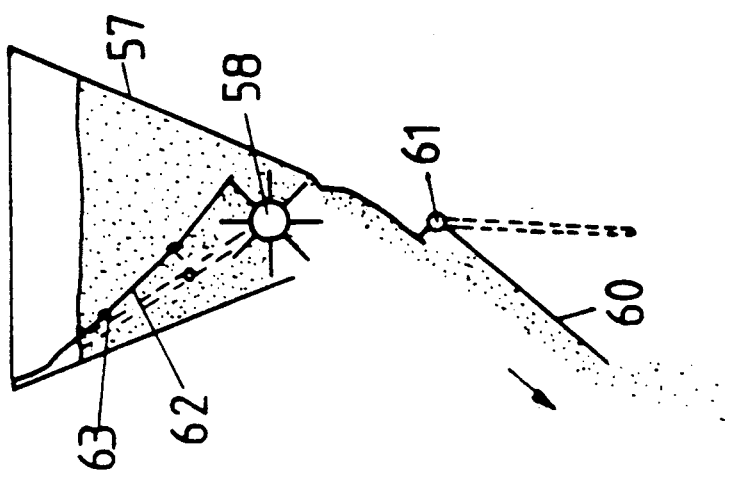
Figure 18:
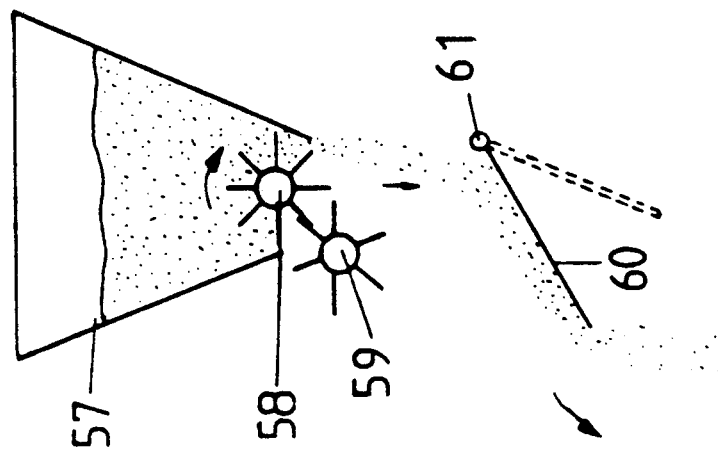
Figure 21:
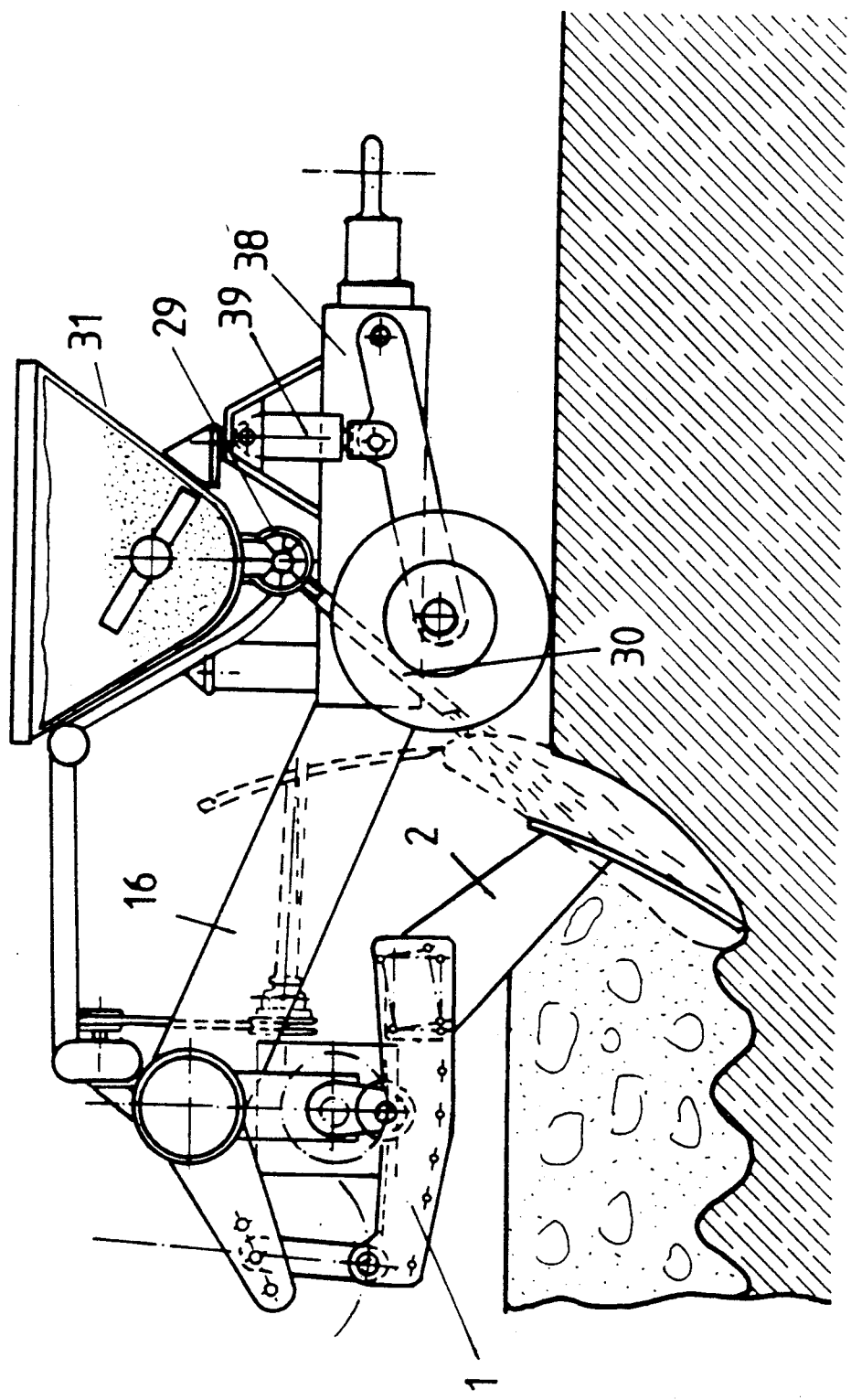
Figure 29:
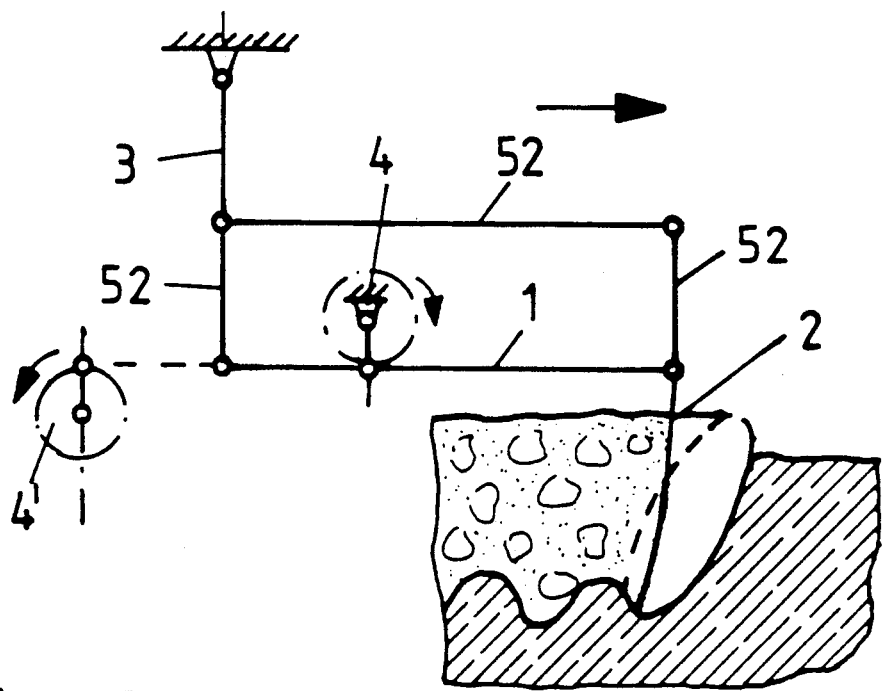
Figure 30:
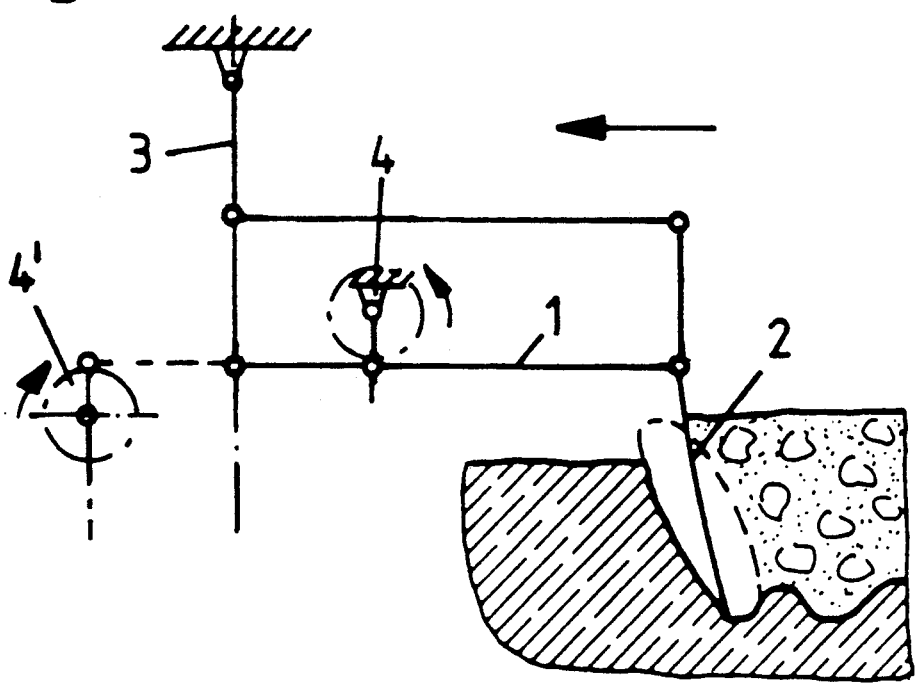

The invention is explained in more detail in the following description by means of model examples depicted in the figures. There are shown:

FIG. 1 a schematic representation of the apparatus according to the invention;

FIG. 2 a modification of the model form of the apparatus depicted in FIG. 1;

FIGS. 3a–g the course of the process in six steps upon loosening of the soil by the digging tool;

FIGS. 4a–g the course of the process corresponding to FIG. 3, with, however, the use of a different digging tool;

FIG. 5 work sequence in top view of the apparatus with construction as an apparatus with four crossbeams;

FIG. 6 a diagrammatic view of the movable crossbeam for mounting of the tool;

FIG. 7 a view of the overall apparatus in profile;

FIG. 8 a further model form of the apparatus depicted in FIG. 7 in combination with a safety apparatus upon hitting an obstruction;

FIG. 9 a further model form of this apparatus according to FIG. 8;

FIG. 10 a model form of this apparatus with a spring blade as a tool;

FIG. 11 a further model form of the apparatus according to the system of loosening by breakage, in profile;

FIG. 12 a modification of this model form;

FIG. 13 the apparatus depicted in FIG. 12 with a rock safety apparatus;

FIG. 14 the apparatus depicted in FIG. 8 in position $P_2$ with an indicated soil-improvement fertilizing apparatus;

FIG. 15 a model form of the apparatus in profile with a fertilizing apparatus;

FIG. 16 an enlarged view of the star feeder lock used for metering the fertilizer;

FIG. 17 a longitudinal section through this apparatus;

FIG. 18 a further model form of a fertilizing apparatus;

FIG. 19 a modification of this model form;

FIG. 20 a further model example of a fertilizing apparatus of this type;

FIG. 21 an apparatus of this type as a trailer, in profile;

FIGS. 22–28 the crossbeams with different tool combinations;

FIG. 29 a modification of the lever system depicted in FIG. 1 with the use of seven knuckle joints per tool unit; and FIG. 30 a modification of the model form shown in FIG. 29.

The system basic to the invention is depicted schematically in FIGS. 1 and 2. Rotating crossbeam 1 is driven according to the representations in FIG. 1 or 2.

Only FIG. 1 will be used for the description since the principle according to FIGS. 1 and 2 behaves similarly to the crank with respect to tool kinematics apart from the direction of rotation; however, FIG. 1 permits a more compact method of construction.

It is possible to achieve very diverse soil cultivation effects due to the possibility of being able to attach tools at very diverse points with very diverse shapes, e.g. 2, 2', or 2''.

A crank with radius r rotates around point PK and drives rotating crossbeam 1, which is suspended on lever 3 over knuckle joint points $P_1$-$P_4$ (or $P_2$-$P_4$, $P_3$-$P_4$, ... $P_x$-$P_4$).

Point 6 describes ellipse E1 stipulated by the interaction between lever 3 and crank drive 4 around PK and gear ratio $l_1/l_3$.

Depending on value $l_2$ and HS1, P7 describes ellipse E2. If the complete drive is moved at velocity V in the direction of the arrow, crank drive 4 is driven with a fixed revolution speed in the direction of the arrow and lever 3 is suspended in $P_1$, then P7 describes curve K7 (cycloid).

P6, P8, and P9 as well as P10 and P11 behave in the same manner, however, according to the corresponding proportions.

Although velocity V with regard to P7 brings about a subtractive change in curve K7, the travel velocity behaves additively with regard to P10 in curve K10.

Stated roughly, tools in front of lever 3 such as, e.g., 2 and 2' operate according to the breaking system dominating for this apparatus type while tools arranged behind lever 3 such as, e.g., 2'' conceived for topsoil cultivation operate according to a plowing system.

Heights $HS_1$, $HS_2$, $HS_3$, and $HS_x$ and lengths $l_2$ and $l_3$, etc., produce very different moving characteristics for the rotating crossbeam system which play an important role in their versatile applications due to the different lengths (15, 15') and suspension arrangements at points $P_1$, $P_2$, $P_3$, or $P_x$ as well as different tool shapes 2, 2', 2'', etc.

It can be seen from the individual application examples how these theories being introduced can be applied with regard to the apparatus.

Tool 2 received by the rotating crossbeam in the breaking area is designed with respect to $l_1$ and $l_2$ and HS1 so that curve K7 results upon overlaying of rotation and travel movement at P7. The same, though shifted correspondingly in direction, is accomplished at P6 from ratio $l_1/l_3$.

If a curved blade is proposed between P7 and P6 and this pierces into the soil with continuous repetition as described, the following important effect then results in a loosening by breaking, as is possible with deep fertilization (FIG. 3).

Although tool 2 pierces with a very favorable cutting angle so that a tool orthogonal clearance is present at cut 7, soil displacement is accomplished simultaneously, i.e., stipulated by tilting more strongly toward the travel direction in the topsoil area than toward below, which simultaneously results in a loosening effect of the broken material (see FIGS. 1-3). It can further be recognized from the figures that, upon lifting out tool 2, stipulated by the kinematic conditions, a displacement results toward the travel direction and thus effects a further loosening. It is important in this case that the soil not be mixed or turned as in other soil-improvement processes (good soil to lower soil), but instead is retained in its bed very extensively. The fissure resulting with such a process is suitable for blowing or dropping in fertilizers in powder and granulate form without making contact with or plugging the tool feeding it to the soil.

A pushing action of the carrier vehicle is exerted by this movement of the tool (illustrations 2-6 in FIG. 3) which permits the use of such soil-improvement apparatuses even under poor traction conditions and adverse gradients.

Since only the crank radius on crank drive 4, P5, and, logically, P4 of the rotating beam system are constant, all other sizes are changeable by changeover processes or tool design, curve K7 and generally K9 and K10 as well as the tool orthogonal clearance upon cutting in and the displacement characteristic can be influenced as desired.

Thus, other conditions result for the introduction of soil-improvement fertilizers for use in a forest rather than in field soils, etc.

With the use of tool 2 according to FIG. 4, in which short blade 6 with cutter 7 found above and below is arranged on strut 5, it is possible to minimize the penetration resistance upon penetration or loosening (illustrations 1-3) and to carry out a fine loosening after lifting out the underside of the blade (Illustrations 4-6). With such an arrangement, a shearing and lifting force is released upon cutting in, and withdrawal force and traction force are unleashed on the carrier vehicle upon lifting out. Blade 6, as necessary, can be arranged with very widely varying dimensions corresponding to the respective use. However, the angle of attachment and resulting curve form K7 should be selected in such manner that a tool orthogonal clearance is present during the cutting in.

An apparatus of this type depicted schematically in FIG. 1 consists, as a rule, of at least two rotation systems, in which the most popular design consists of four such, systems The systems operate displaced by 180° in the double combination and displaced to one another by 90° in each case in the quadruple combination. Such an apparatus is depicted schematically in a front view in FIG. 5 and individual blades 6 are recognizable. The arrow shown in FIG. 5 indicates the travel direction. For example, fertilizer is added through pipe 8. At the first right blade 6, the displacement path is depicted with letters X; the blade is shown upon cutting in and being displaced. The fissure resulting during the cutting-in and displacement processes is shown behind blade 6, represented by distance X.

The lateral distance of this blade 6 lies between 50 and 80 cm, with the eccentric sequence of rows as a rule being accomplished from right to left in the quadruple apparatus. Other row sequences can also be required, depending on the use and tool.

Hydrostatic, rotating crossbeam 1 driven by a driveshaft is depicted in profile in FIG. 6. Crossbeam 1 has bearing 9 approximately in the center with which drive 4 engages. Side pieces 10 or 11 are found at a distance from one another on both sides of bearing 9. Holes 12 or 12' are provided on side piece 10 to provide the cutting angle to be used as needed corresponding to the different tools 2. Furthermore, a number of holes 13 are present for the introduction of additional cultivating tools. The area of loosening by breaking is represented in FIG. 6 by arrow 14 and the plowing area is represented by arrow 15.

The overall apparatus is depicted in FIG. 7. Support 16 which exhibits front plate 17 on which side pieces 18 are attached serves for installation of the apparatus to a traction vehicle; the side pieces in turn are arranged on transverse support 19 which is designed as a pipe in the shown model example with further side pieces 20 being arranged toward the other side. The arrangement of this frame 16 on a vehicle can be accomplished by means of known three-point arms or parallelogram systems through corresponding bearing points. Drive 4 and thus also crossbeam 1 are suspended on transverse support 19 in which, furthermore, a mounting of crossbeam 1 is accomplished on side pieces 20 through connecting rod 3. Various holes 21 are introduced on side pieces 20 so that the movement of crossbeam 1 can be variously influenced by a corresponding connection of connecting rod 3 to a selected one of the openings 21, FIG. 7, of which three are shown. Thus, the lateral distance of the center of motion, represented by knuckle joint (P3), may be varied compared to knuckle joint (P4). Suspension positions 21 can be constructed with stepless adjustment. Side pieces 20 are intentionally labile for the removal of stress peaks perpendicular to the travel direction; lateral vibrations are desirable, and are designed to be fixed in the vertical direction.

Various tools 2 are mounted on crossbeam 1 with the front tool in horizontal travel direction a, serving for deep loosening by the breaking system; tool 2′ is present for surface cultivation and for cutting or pulverizing the crop residues by the breaking system. Finally, harrow spikes 22 are present for fine-surface cultivation, and duckfoot blade 22′ for cultivation by the plowing system. Drive 4 is connected with the vehicle through driveshaft 23.

When tool 2 pushes against a rock 24 or another obstruction, then an overload safety is provided according to FIG. 8, consisting of coil spring 25 or a hydraulic cylinder with a damping member or a gas cushion. This damping apparatus 25 is found between shackle 3 and side pieces 20 of support 16. It is recommended in this case to choose a very flat characteristic so that the drive elements are not stressed by too high peak moments and so that the combined lifting force remains within the limits. Spring path h of overload safety 25 is dependent on the position of the obstruction. The obstruction is merely impinged with a certain force for such a time until the crankshaft of drive 4 lifts up tool 2 upon reaching of a certain crank angle. Thus, the tool feels its way over the obstruction which remains in the soil and ensuring tool 2 against wear and the danger of breakage.

In apparatuses without overload safety, the safety exists in that the whole apparatus is simply lifted from the ground in combination with a float hydraulic system with overload or upon hitting an obstruction. However, it is recommended to select such a design only in combination with a low-weight two-cog apparatus since such apparatuses are used directly for limited depths with fewer obstructions.

In the further model form according to FIG. 9, spring member 26 is provided between crossbeam 1 and tool 2 is installed hinged to crossbeam 1. Thus, an overload safety is present.

In the further model form shown in FIG. 10, springing tool 27 (spring blade) is attached on crossbeam 1. It possesses elastic properties in the horizontal and vertical direction. Since the tool is more elastic in the horizontal direction than in the vertical direction (see fh), it can be assumed that the peak almost always remains in the vicinity of the lower dead point in the area of crank area a. On the crank path a, shift a1, i.e., an intensified push and loosening action in the horizontal direction, results in upper blade area o. Furthermore, the earth fissure resulting at this moment Sp is larger than with other tools listed previously and is very well suited for the blowing in of fertilizers. Then, the blade is lifted in crank area b so that elastic energy is released in the lower blade area which releases an additional loosening effect in arrow direction x. A safety on all sides in the form of a combination with a previously described swinging lever safety (FIGS. 8 and 9) can be accomplished under extreme conditions.

It has been explained in combination with FIG. 1 that tool 2″ operates according to the break-loosening system. A model form of construction for an apparatus of this type is depicted in FIG. 11 in which crank drive 4 drives rotating cross beam 1 with eccentricity e, which possesses very diverse receptacle possibilities as in FIG. 6. Lever 3 with length 1h which can be suspended in position P1 to P5 ensures that hinge point P6 carries out an almost horizontally directed or slightly inclined short lifting motion. Strut 5 attached in rotating crossbeam 1 possesses blade 7 at the lower end. The rotation kinematics act on the blade movements so that the very different ellipses E1 or E2 result in dependence on h1, h2, h3, 1H, a, P1, P2, P3, P4, P5, or Px, as well as e.

However, basically, the kinematics must be chosen so that E1 wider area and more vertically. By this it is ensured that a cutting action proceeds from the peak and a lifting action displacing to above proceeds from the area of blade end 7′. Angle $\alpha$, blade length S1, height h1, and the blade width also have a great influence on the loosening intensity. Dimension a can be influenced by the displacing of strut 5 by a1 or also by attachment at other positions. The overlayings of E1 and E2 with the driving speeds also yield cycloids here so that the cutting in of blade tip 7 is accomplished at higher velocity and with smaller angle $\alpha$ and the plowing is accomplished with almost stationary blade tip 7 and blade end moving to above. Depending on the use, however, other relationships can also be selected. Support wheels can be mounted at suitable points if the axle load of the traction mechanism becomes too large due to the forces acting on the blade surface to above.

FIG. 12 shows a similar model form of the apparatus depicted in FIG. 11 in which side pieces 20 displaced by approximately 180° are arranged on transverse support 19. Also, the tool kinematics here behave similarly as described in the foregoing, in which the rotation direction of the drive is reversed.

The apparatus depicted in FIG. 13 is provided with a rock safety longitudinal and transverse to the travel direction. In this case, the longitudinal safety is accomplished by prestressed elastic member 25 between side pieces 20 and crossbeam 1. For transverse safety, strut 5 is suspended on crossbeam 1 by means of hingelike apparatus 56 swinging to the side so that blade 6 is stabilized vertically in normal operation, stipulated by the force of gravity, and is deflected sideways upon hitting an obstruction. A lateral rock safety, however, is also achieved by designing strut 5 in travel direction a fixed and movable or elastic laterally. The forces in lever 3 have a reverse action with a longitudinal safety corresponding to the model form according to FIG. 11.

In the model form shown in FIG. 14, apparatus 28 which can be attached to frame 16 is indicated for the feeding of additives, such as fertilizers. This model form is advantageous particularly for use in a forest since soil-improvement fertilizers can be introduced at the highest possible rate and distributed well on the roots. This is accomplished by cutting tool 2, curved sharply downward, cutting into the soil, lifting it, and blowing in the fertilizer at the instant of the formation of a fissure. For this, connecting rod 3 is attached on hinge point P2 in order to obtain a course of the curve that is as flat as possible. This curve course c is drawn in as a dotted line.

Apparatus 28 of this type for the feeding of these types of additives is depicted in FIG. 15. Apparatus 28 possess metering apparatus 29 which, for example, is constructed as a star feeder lock to which feed pipe 30 is connected. Container 31 with stirring mechanism 32 is found above metering apparatus 29. Furthermore, metering apparatus 29 is connected with blower 34 through air feed lines 33 so that the agent can be brought out at the appropriate pressure. The drive of blower 34, for example, is accomplished by power take-off shaft 23. Pipe 30 in this case is tiltable around metering apparatus 29, as is indicated in FIG. 15. This apparatus 28 can be attached to apparatus frame 16 as a modular part. There is the possibility in this case of blowing the fertilizer in shockwise as the ground is fissured with each cut, or blowing in continuously with acceptance of the fact that fertilizer is blown on the surface in the phase between 6 and 1 (FIGS. 3 and 4). With shockwise blowing, it must be ensured that the fertilizer feed is interrupted exactly in phases 6 to 1, i.e., the gear ratio between the crankshaft and lock shaft must be 1:1 with one interrupter nub 35 or 2:1 with two interrupter nubs 35. Furthermore, interrupter nubs 35 must cover outlet 36 in phase 6 to 1. The metering is accomplished by metering disk 37 by appropriate adjustment of the cross section of the opening. With continuous charging, star feeder 29 or the metering wheel possesses only driver nubs. The amount regulation in this case can also be accomplished by a metering disk or through a stepless revolution speed control whereupon the metering disk can be omitted. A dependence on the crankshaft revolution speed is not necessary here; instead, there is a coupling with a control dependent on travel speeds. A container with continuous charging can also be introduced on the carrier vehicle.

Since the air is blown in perpendicular to lock 29 and thus also perpendicular to driver nubs 35' of the metering wheel, a continuous cleaning effect is produced and a plugging of the lock is avoided. Furthermore, pipe 30 can be short and can be provided just with a wide bend, which also ensures a disturbance-free operation. Pipe 30 can also be constructed as a tube. In this case an optimal alignment to the fissure in the earth is possible in combination with an adjustable attachment. Furthermore, this offers the possibility if needed to mount blowing tubes, e.g., 30' for the topsoil tool, between blowing tubes 30 for deep tool 2.

For the prevention of air flows in fertilizer container 31, nubs 35' must simultaneously have sealing and transfer functions. This is ensured by using elastic and resistance material. Also, solutions are conceivable which introduce the fertilizer into the ground fissure without air blowing by carefully directed free-fall or through hurling apparatuses.

The apparatus depicted in FIGS. 15-17 for the introduction of fertilizers and additives can have a very simplified design in many cases. An air blower is not necessary for discharge of granulate materials.

Star feeder lock 58, which for example can be operated dependent on the travel speed by a support wheel, is found in the bottom opening of container 57 in the model form shown in FIG. 18. Impingement plate 60 attached at hinge point 61 and adjustable in deflection angle is found below star feeder lock 58; the material can be led to the desired point by a direction correction of this plate. A further star feeder 59 is found beside star feeder lock 58 engaging in this to prevent pluggings during discharge of the material.

Vibrating apparatus 62, designed as a type of compound spring, is found in the model form shown in FIG. 19; this compound spring exhibits lateral vibrating prongs 63 so that a bridge formation in container 57 is prevented.

A further model form of the apparatus is depicted in FIG. 20 in which conveyor belt 64 with nubs 66 takes over the transporting and metering function in this case. Here, the possibility exists to construct container 65 as a square so that bridge formations are excluded from the outset. The drive of conveyor belt 64 is accomplished dependent on the driving speed, in which an intermediate drive with stepless control permits the adjustment of the scattering density. Impingement plates likewise can be installed for carrying out direction correction in the falling stream. The apparatuses depicted in FIGS. 18 to 20 are also insensitive toward friable additives and fertilizers.

In the model form of the apparatus depicted in FIG. 21, the individual parts, i.e. crossbeam 1 with its frame 16 and metering apparatus 29 with container 31 and feed pipe 30, are installed on trailer vehicle 38 in which container 31 is arranged so that it acts as weight balance for loosening aggregate 2. The up-and-down motion is accomplished by means of one or two hydraulic cylinders 39 through the hydraulics on board the traction mechanism or by its own hydraulics which can be actuated from the driver's seat of the tractor by remote control.

Various tool types and combinations on the crossbeam 1 are depicted in the further FIGS. 22-28. For an overlapping action, various tool combinations can also be operated alongside one another with a multi-crossbeam system. In the arrangement shown in FIG. 22, tool 2 is mounted in area 10 of crossbeam 1 which exhibits approximately the shape of the tool shown in FIG. 4 with strut 5 and blade 6 for deep loosening or deep fertilization with a subsequent cultivating tool 40 being provided for the topsoil area, which exhibits wide spade 41 which possesses good properties for cutting through crop residues and incorporating them into the soil. Furthermore, similarly as in deep fertilization, soil-improvement fertilizers can be blown in and incorporated behind the ground fissure or fertilizers can be introduced in this manner on the topsoils. In the topsoil area, blade 6 is intentionally arranged so that a turning or mixing of the topsoil takes place.

Figure 23:
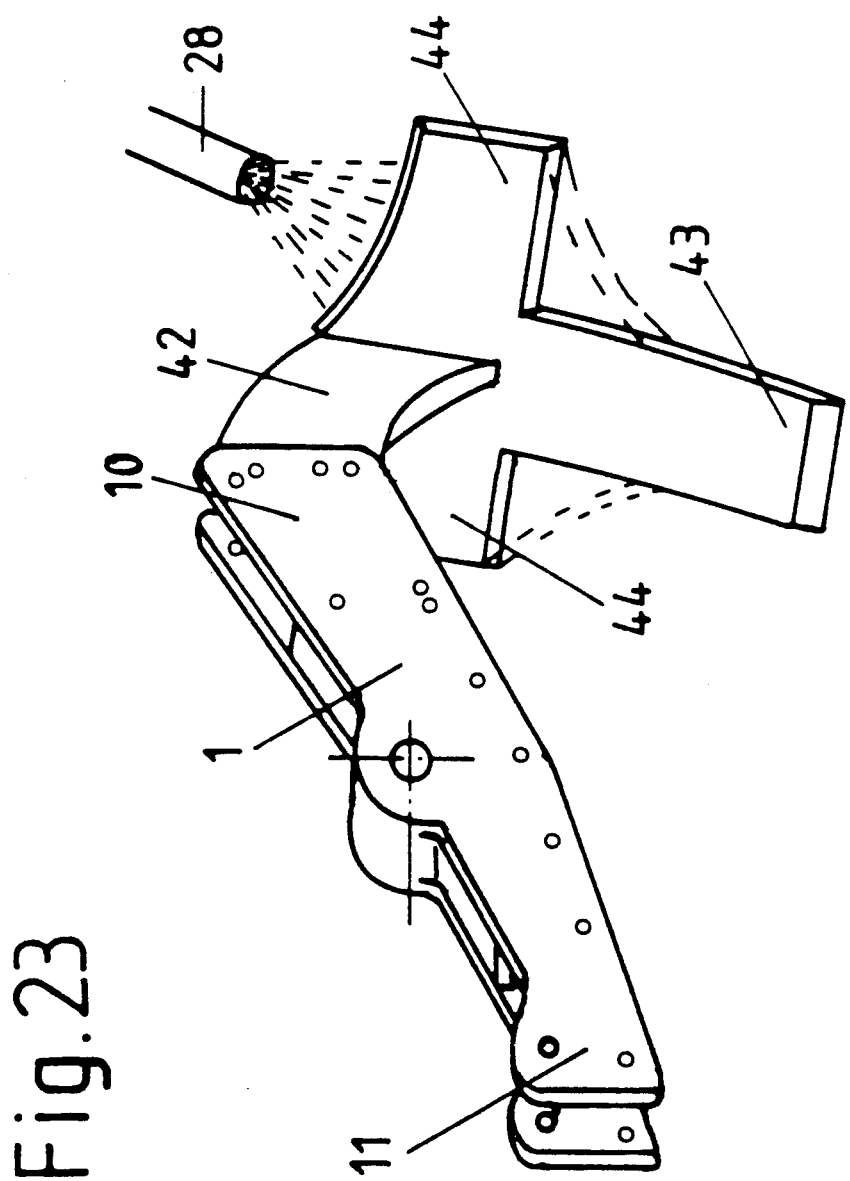

In the further model form depicted in FIG. 23, tool 42 is shaped in such manner that a deeply penetrating part 43 is provided. Additional side blades 44 are provided at this part 43 in the upper area in order to enlarge the opening of the fissure and for the introduction of fertilizers. Simultaneously, a topsoil cultivation and a safe separation from the crop residues are achieved by such a solution.

Figure 22:
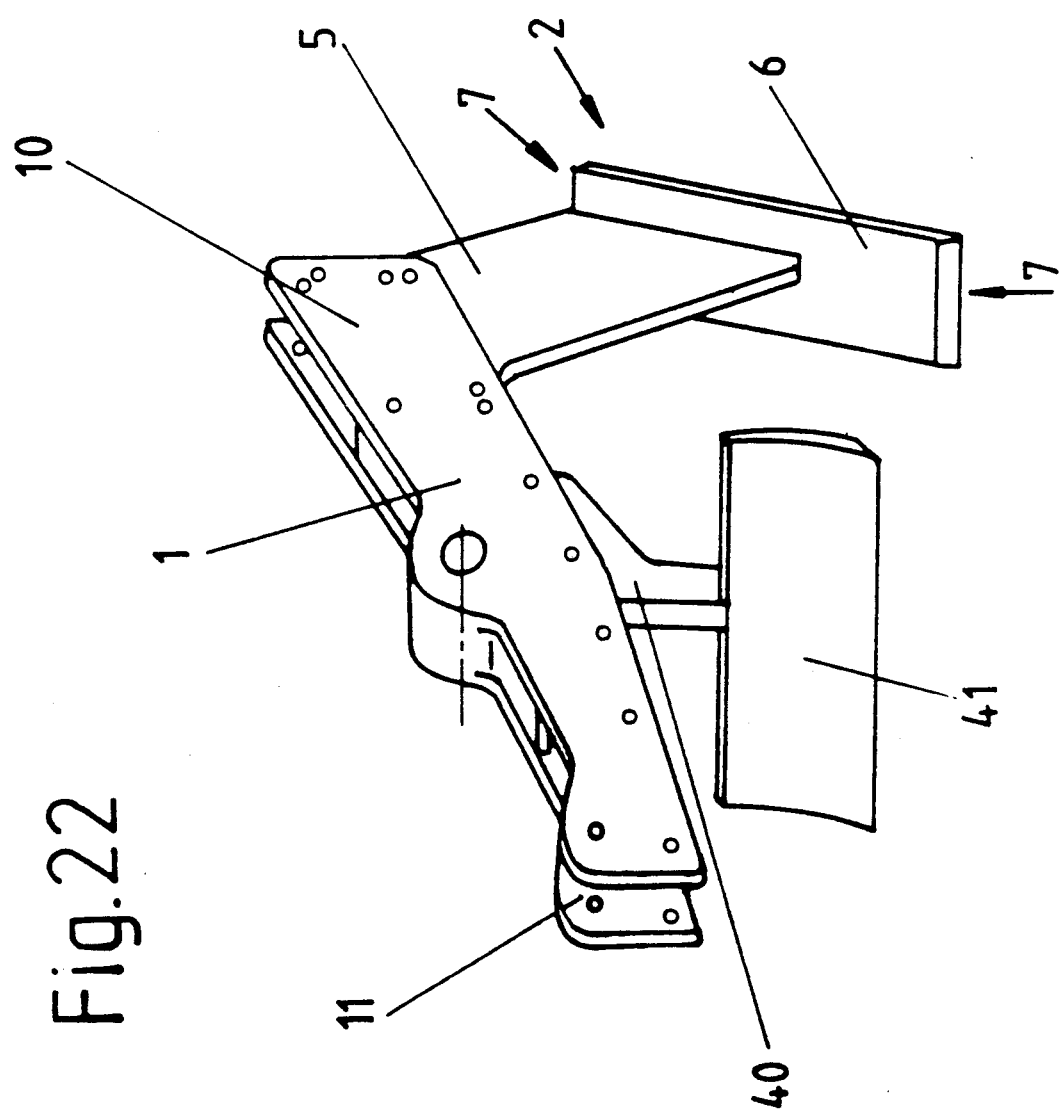
Figure 24:
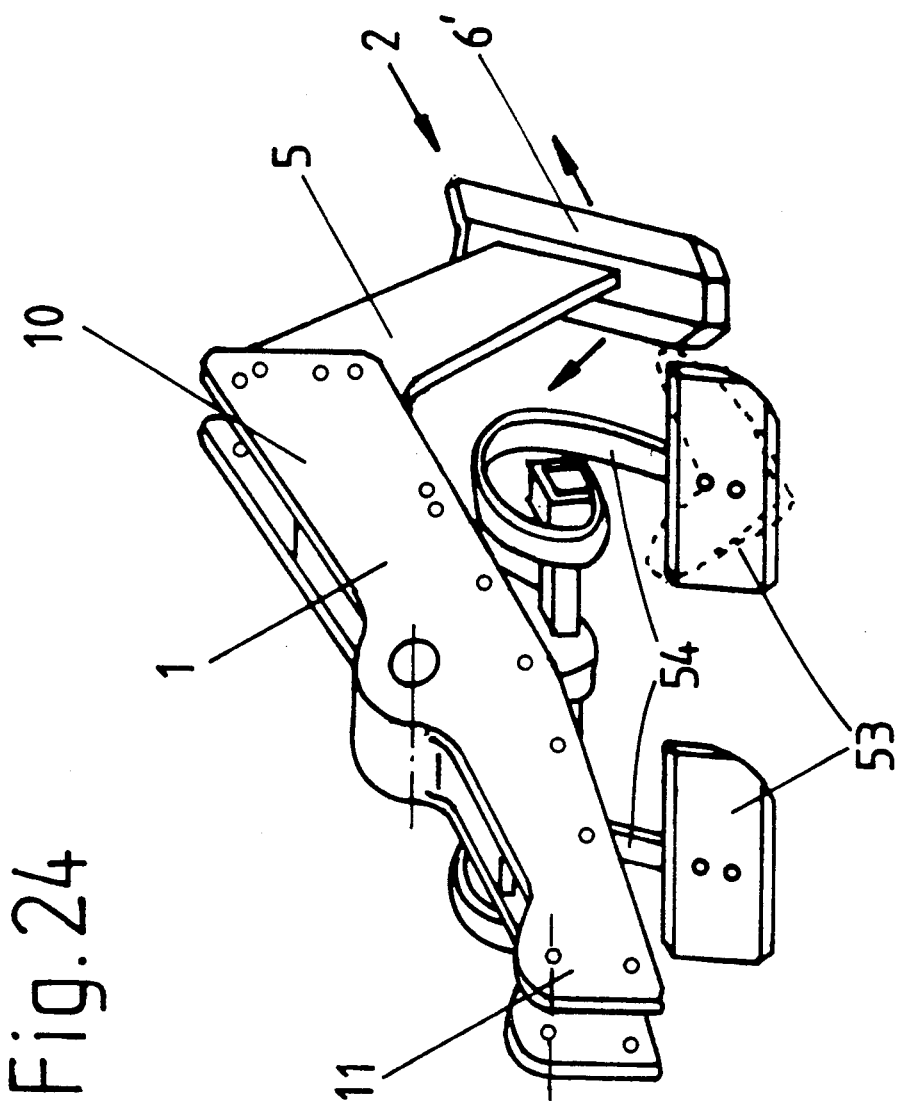

In a model form according to FIG. 24, tool 2 is somewhat modified compared to the model form in FIG. 22 by laterally beveling the deep loosening blade 6' and thus combining the effect of an improved side action. Furthermore, topsoil blades 53 are arranged approximately in the center of crosspiece 1 which are protected against overload by spring safeties 54. Very different tools such as cultivator blades, duckfoot blades, etc., can be mounted on springs 54.

Figure 25:
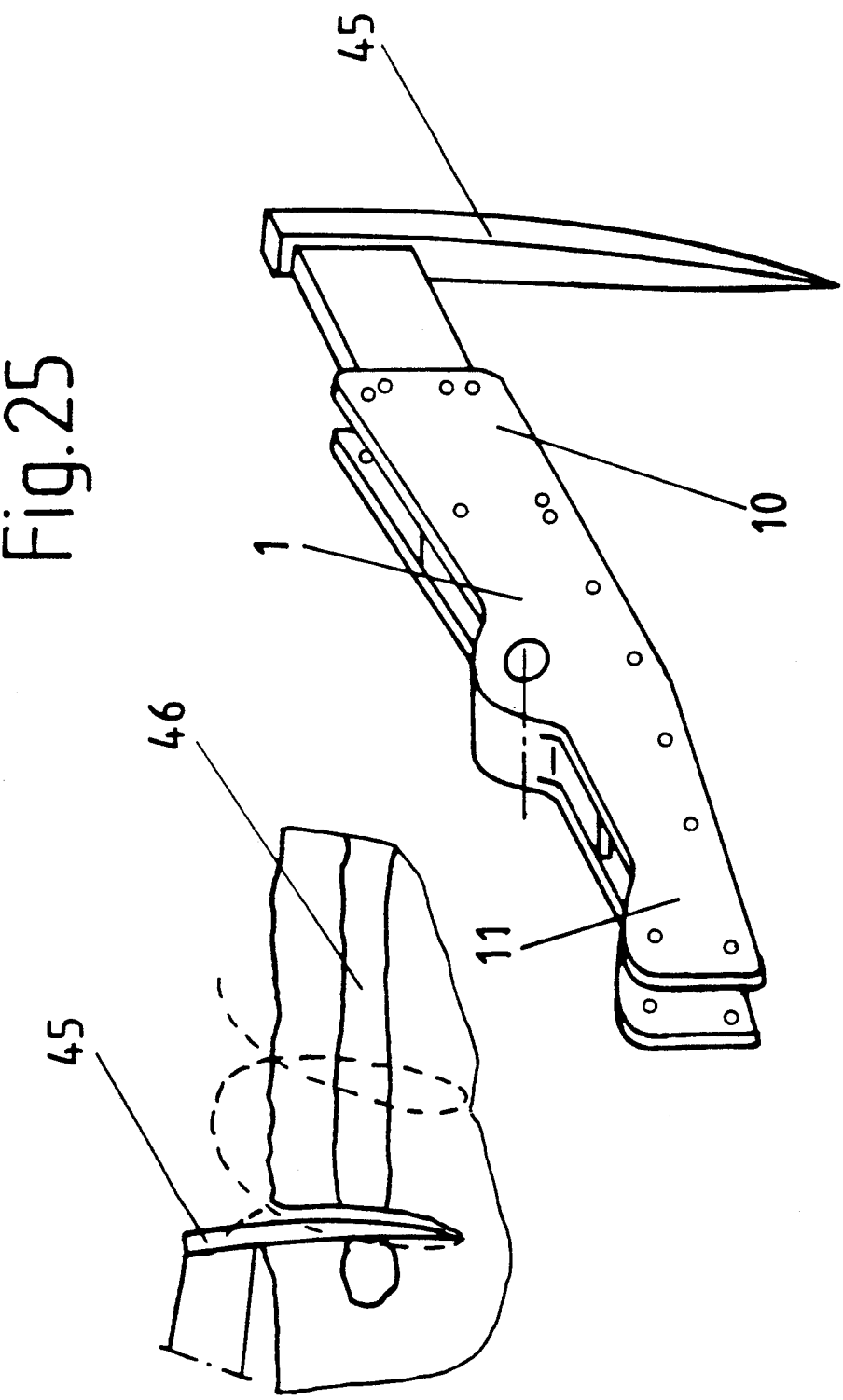

According to the model form in FIG. 25, deep spade 45 is mounted on crossbeam 1. Such a tool is suitable to roughly preloosen extremely hard soils in order to, e.g., permit a good frost action. The tool in this case can penetrate very well into compaction horizon 46 and thus eliminate waterlogging. The water flow down deep is ensured by very rough impacting and breaking up of these layers. The driving speed in this situation can be substantially higher than in the fine loosening which is equivalent to a correspondingly higher surface performance. By overlaying the higher driving speed with the rotation ellipse, a resulting curve course results as is apparent in the figure depicted in FIG. 25. A correspondingly steep position of the tool is to be considered as shown in FIG. 25.

Figure 26:
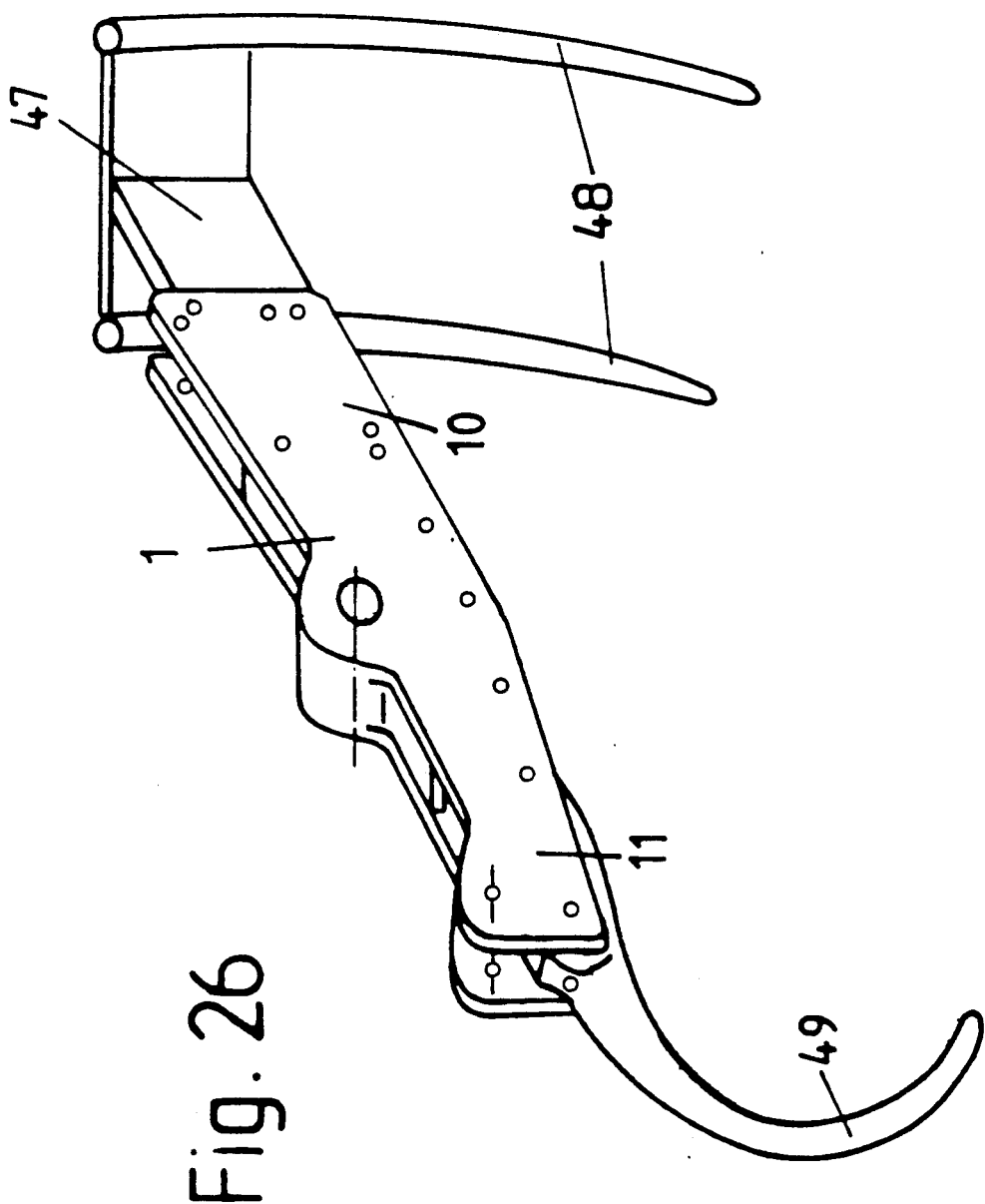

Tool 47 depicted in FIG. 26 exhibits two deep prongs 48 in the breaking-up area as well as trailer prong 49 in the cutting area and is conceived for a medium-coarse soil cultivation.

Figure 27:
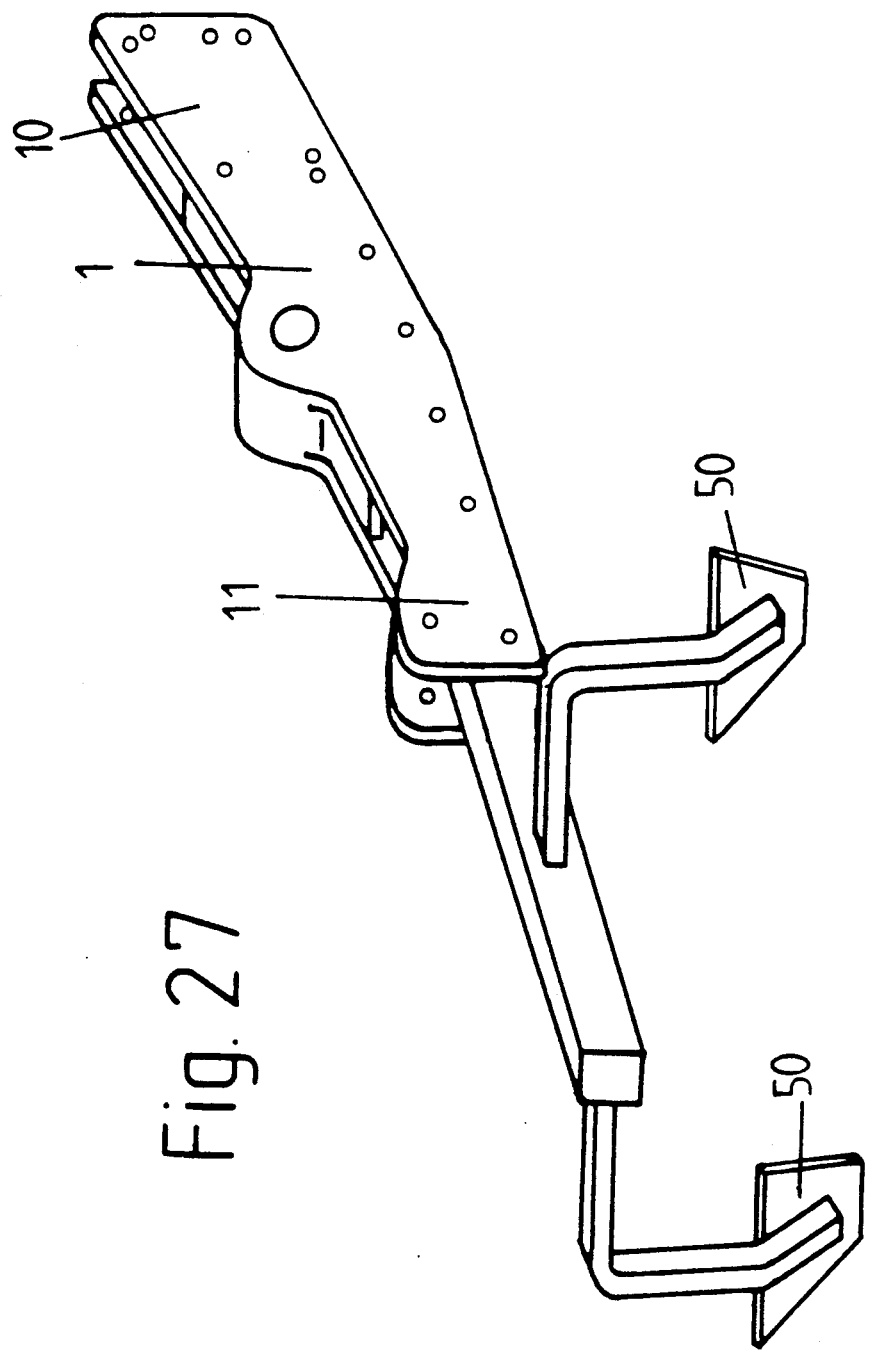

FIG. 27 shows rotating crossbeam 1 with two blades 50 displaced from one another in the plowing area. An improved penetrability is ensured by the length displacement, especially with the multi-crossbeam system in which the blades are arranged in zig-zag design.

Figure 28:
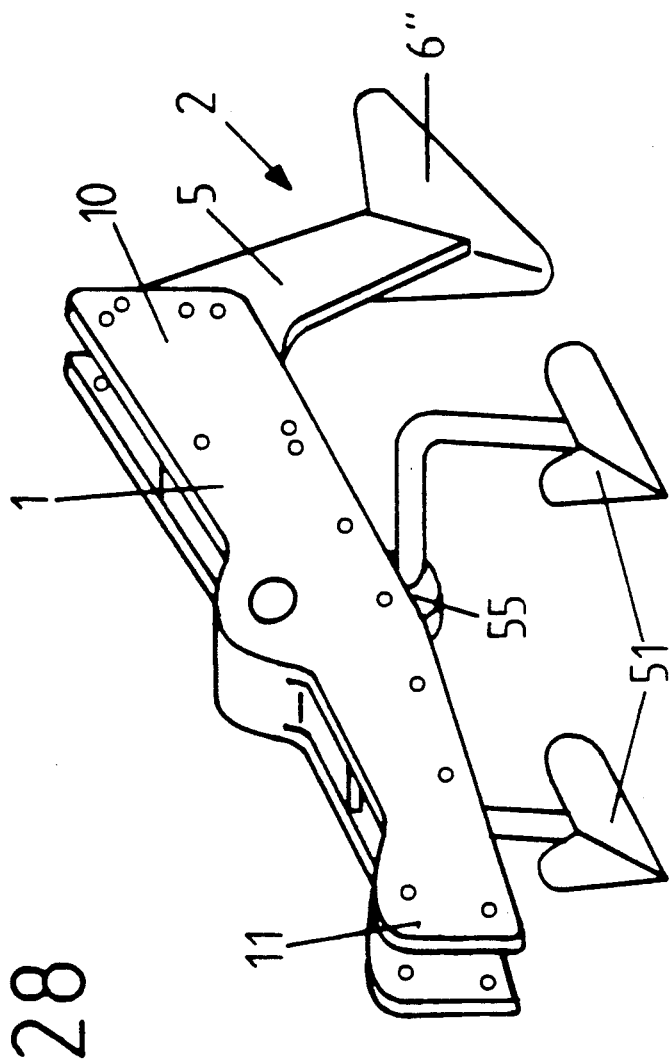

The model form according to FIG. 28 shows the arrangement of tool 2 for deep soil cultivation with strut 5 and duckfoot blade 6''. Further duckfoot blades 51 are arranged in the center of crossbeam 1 for topsoil cultivation where such a tool combination is suitable for up-and-down loosening and for applications where mixed effects are necessary. Center attachment 55 of the shackle for the duckfoot blade can also be accomplished with elastic or swinging sides. In this manner, an optimal protection exists when a side hits upon an obstruction. FIGS. 29 and 30 show a modification of the model form according to FIGS. 1 and 2 for the rotating crossbeam system in which crossbeam 1 and tool 2 are connected through additional crossbeams 52 in the form of a parallelogram. However, these systems are more expensive and more sensitive since seven knuckle joints are required per tool combination in place of four knuckle joints. The depicted rotation ellipse can be influenced as desired by lever proportions, eccentricity, and eccentric position. In this case, drive 4 also can be arranged on the outside as characterized by drive 4'. The travel direction can be chosen as in FIG. 29; however, it also can be in the opposite direction as in FIG. 30. This latter solution has substantial disadvantages with respect to the following cultivating tools and fertilization; however, it has its advantages with respect to penetrability since no bulky structural parts follow behind the tools.

With tractors of modern-type construction with a power take-off shaft drive on the front side, it is also possible to mount these types of apparatuses equally on the front and rear sides for weight balance.

I claim:

1. Soil loosening apparatus to partake of a predetermined travel distance, comprising a crossbeam (1) serving a support for digging tools (2, 2', 2'') and linked through a first knuckle joint (P4) aligned perpendicular to the travel direction on a frame connected tightly with a traction vehicle and tiltable in a vertical plane extending in the travel direction by means of crank or eccentric drive (4) around said first knuckle joint (P4) engaging through a second knuckle joint (P5) with crossbeam (1), characterized by the fact that first knuckle joint (P4) is arranged at the lower end of a lever (3) with preselectable lever length ($l_5$, $l_{5'}$), whose upper end is linked on the frame connected tightly with the traction vehicle in a preselectable position through a third knuckle joint (P1 ... P3) aligned perpendicular to the travel direction, that the distance of the third knuckle joint (P1 ... P3) from said knuckle joint (P5) is smaller than the sum of lengths ($l_5$, $l_{5'}$) of said lever (3) and the distance ($l_1$) of said first knuckle joint (P4) from said second knuckle joint (P5), that the diameter of the circle described by crank drive does not intersect with the connecting line between said first knuckle joint (P4) and said third knuckle joint (P1 ... P3), and that the length of lever (3) is larger than the radius of the circle described by the crank drive; further characterized by the fact that the eccentric drive (4) and crossbeam (1) are suspended on a transverse support (19) with a side piece (20) projecting generally perpendicularly therefrom, which side piece has various longitudinally spaced holes (21) to which the upper end of lever (3) may be variantly connected with corresponding variance in the longitudinal displacement of knuckle joint (P3), which is the center of motion, compared to knuckle joint (P4) thereby varying the longitudinal distance of the center of motion compared to knuckle joint (P4).

2. Apparatus according to claim 1, characterized by the fact that several digging tools (2, 2', 2'') are arranged on crossbeam (1).

3. Apparatus according to claim 2, characterized by the fact that the transverse support (19) is held by a frame member (16) on the side opposite the side piece (20), which frame member is adapted to be attached to a traction vehicle.

4. Apparatus according to claim 2, characterized by the fact that apparatus (28) for the feeding of additives such as fertilizers is provided on frame (16).

5. Apparatus according to claim 4, characterized by the fact that apparatus (28) includes a feed pipe (30) communicating with a metering apparatus (29).

6. Apparatus according to claim 5, characterized by the fact that said metering apparatus (29) is constructed as a star feeder lock (58) and an air feed (33) connected to blower (34) communicates with metering apparatus (29).

7. Apparatus according to claim 5, characterized by the fact that a container (31) with stirring mechanism (32) is arranged above the metering apparatus (29).

8. Apparatus according to claim 5, characterized by the fact that a metering disk (37) is arranged in the bottom of container (31) in front of metering apparatus (29).

9. Apparatus according to claim 1, characterized further by the fact that crossbeam (1) has a bearing (9) for drive (4) approximately in the center, and further by side pieces (10, 11) which are provided with a hole pattern (12, 12') for mounting of tools (2, 2', 2'').

10. Apparatus according to claim 1, characterized by the fact that lever (3) is supported elastically on side piece (20) by a spring member (25).

11. Apparatus according to claim 10, characterized by the fact that several crossbeams (1) with tools (2, 2', 2'') distributed thereon beside one another are held by frame member (16) which is attachable to the traction vehicle.

12. Apparatus according to claim 1, characterized (FIG. 9) by the fact that an overload safety spring (26) is provided between the crossbeam and the digging tool.

13. Apparatus according to claim 1, characterized (FIG. 10) by the fact that the digging tool is a springing tool (27) configured to be more elastic in the horizontal direction (FIG. 10) than in the vertical direction.

14. Apparatus according to claim 13, characterized by the fact that the springing tool (27) is sickle-shaped.

15. Apparatus according to claim 1, characterized by the fact that the tool (2) has a short blade (6), with cutters (7) on the lower and upper side, and which is attached to the cross beam by a strut (5).

16. Apparatus according to claim 1 characterized by the fact that a spade tool (40, FIG. 22) is arranged on crossbeam (1) in spaced relation to a loosening toll (2).

17. Apparatus according to claim 1, characterized (FIG. 23) by the fact that the digging tool includes a laterally projecting side blade (44) at the upper end of a loosening tool (43).

18. Apparatus according to claim 1, characterized by the fact that loosening tool (2) is laterally beveled and that supplemental tools (53) are provided on spring safeties (54, FIG. 24).

19. Apparatus according to claim 1, characterized by the fact that two blades (50) are displaced with respect to one another on crossbeam (1).

20. Apparatus according to claim 1, characterized by the fact that crossbeam (1) is arranged with a parallelogram lever system (FIGS. 29 and 30).

* * * * *